United States Patent [19]

Zapisek

[11] Patent Number: 5,345,556
[45] Date of Patent: Sep. 6, 1994

[54] ROUTER CHIP WITH QUAD-CROSSBAR AND HYPERBAR PERSONALITIES

[75] Inventor: John Zapisek, Cupertino, Calif.

[73] Assignee: MasPar Computer Corporation, Sunnyvale, Calif.

[21] Appl. No.: 693,846

[22] Filed: Apr. 30, 1991

Related U.S. Application Data

[62] Division of Ser. No. 461,551, Jan. 5, 1990.

[51] Int. Cl.⁵ ............................................. G06F 13/00
[52] U.S. Cl. ...................................... 395/200; 395/275
[58] Field of Search ..................... 395/200; 340/200; 320/200

[56] References Cited

U.S. PATENT DOCUMENTS

| | | | |
|---|---|---|---|
| 4,314,349 | 2/1982 | Batcher | 364/716 |
| 4,399,531 | 8/1983 | Grande et al. | 370/6 |
| 4,523,273 | 6/1985 | Adams, III et al. | 364/200 |
| 4,550,431 | 10/1985 | Werth et al. | 382/1 |
| 4,709,327 | 11/1987 | Hillis | 364/200 |
| 4,739,476 | 4/1988 | Fiduccia | 364/200 |
| 4,766,534 | 8/1988 | DeBernedictis | 364/200 |
| 4,797,928 | 1/1989 | Dykes | 380/49 |
| 4,814,980 | 3/1989 | Peterson | 364/200 |
| 4,891,787 | 1/1990 | Gifford | 364/900 |
| 4,929,940 | 5/1990 | Franaszek et al. | 340/825.02 |
| 4,939,692 | 7/1990 | Kendall | 365/189.03 |
| 4,943,946 | 7/1990 | Brent | 365/189.12 |
| 4,979,147 | 12/1990 | Ushiki | 365/189.04 |
| 4,984,201 | 1/1991 | Sato et al. | 365/154 |
| 4,984,216 | 1/1991 | Toda et al. | 365/230.08 |
| 4,984,235 | 1/1991 | Hillis et al. | 370/60 |
| 4,985,832 | 1/1991 | Grondalski | 364/200 |
| 4,999,528 | 3/1991 | Keech | 307/279 |
| 5,001,702 | 3/1991 | Teraslinna et al. | 370/60 |
| 5,088,091 | 2/1992 | Schroeder et al. | 310/94.3 |

*Primary Examiner*—Arthur G. Evans
*Assistant Examiner*—C. Shin
*Attorney, Agent, or Firm*—Skjerven, Morrill, MacPherson, Franklin & Friel

[57] ABSTRACT

A router circuit for selectively connecting an input terminal of the router circuit to either a specified output terminal of the router circuit (crossbar personality) or to any of a group of output terminals of the router circuit associated with a single output channel (hyperbar personality). The router circuit is made configurable as either a crossbar switch or a hyperbar switch by dividing the router chip into sections, where each section is associated with a group of input terminals, and wherein various grant circuits within each of the sections have enable/disable input terminals connected by controllable switches to either enable/disable output terminals of grant circuits in an adjacent section (hyperbar personality) or to fixed logic levels (crossbar personality). In the crossbar configuration, for each input terminal of a section, only one grant circuit per channel is enabled. Each of the sections has a different set of grant circuits enabled per channel so that no two sections can access a same output terminal of the router chip. In the hyperbar configuration, the sections are made transparent, and grant circuits are enabled or disabled depending on output wire availability. Additionally, the router circuit contains novel routing address bit and protocol bit circuitry as well as novel diagnostic circuitry for detecting broken wires between router circuits.

14 Claims, 34 Drawing Sheets

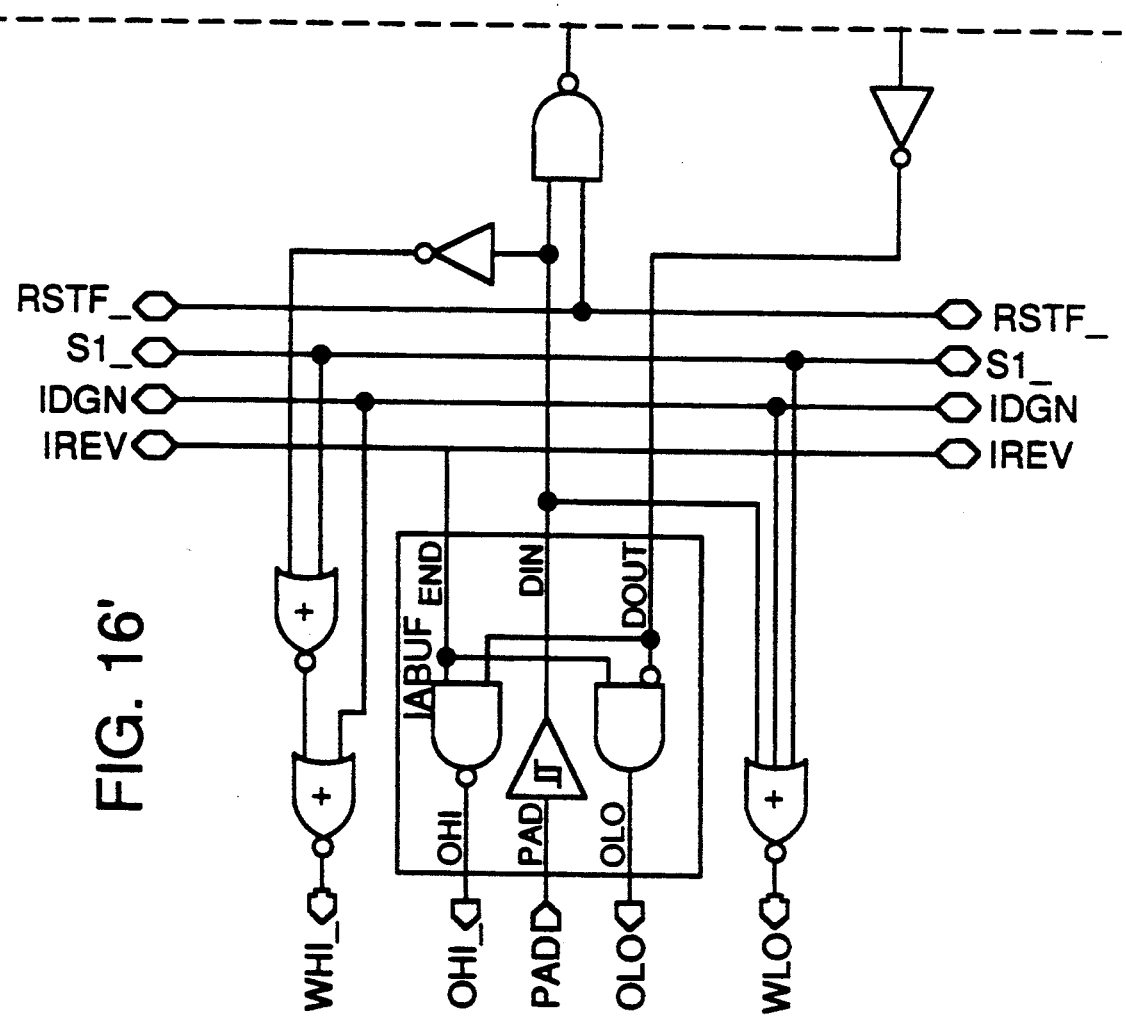
FIG. 16'
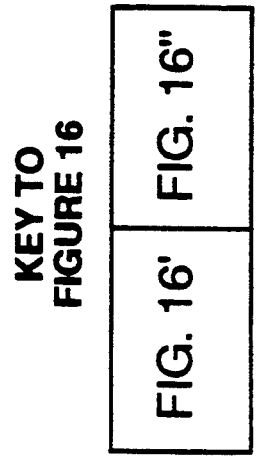
KEY TO FIGURE 16
| FIG. 16' |
|----------|
| FIG. 16" |

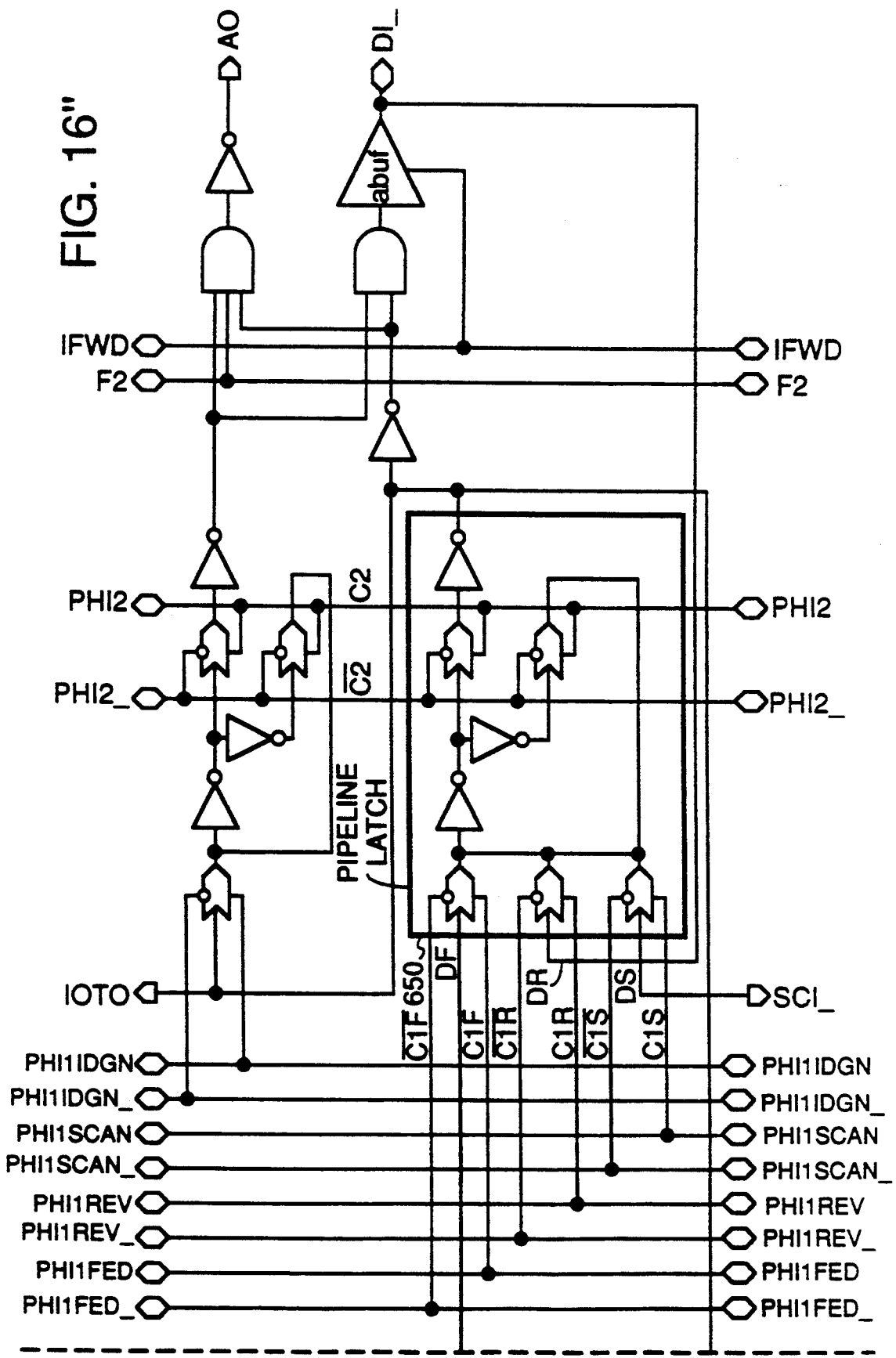
FIG. 16"

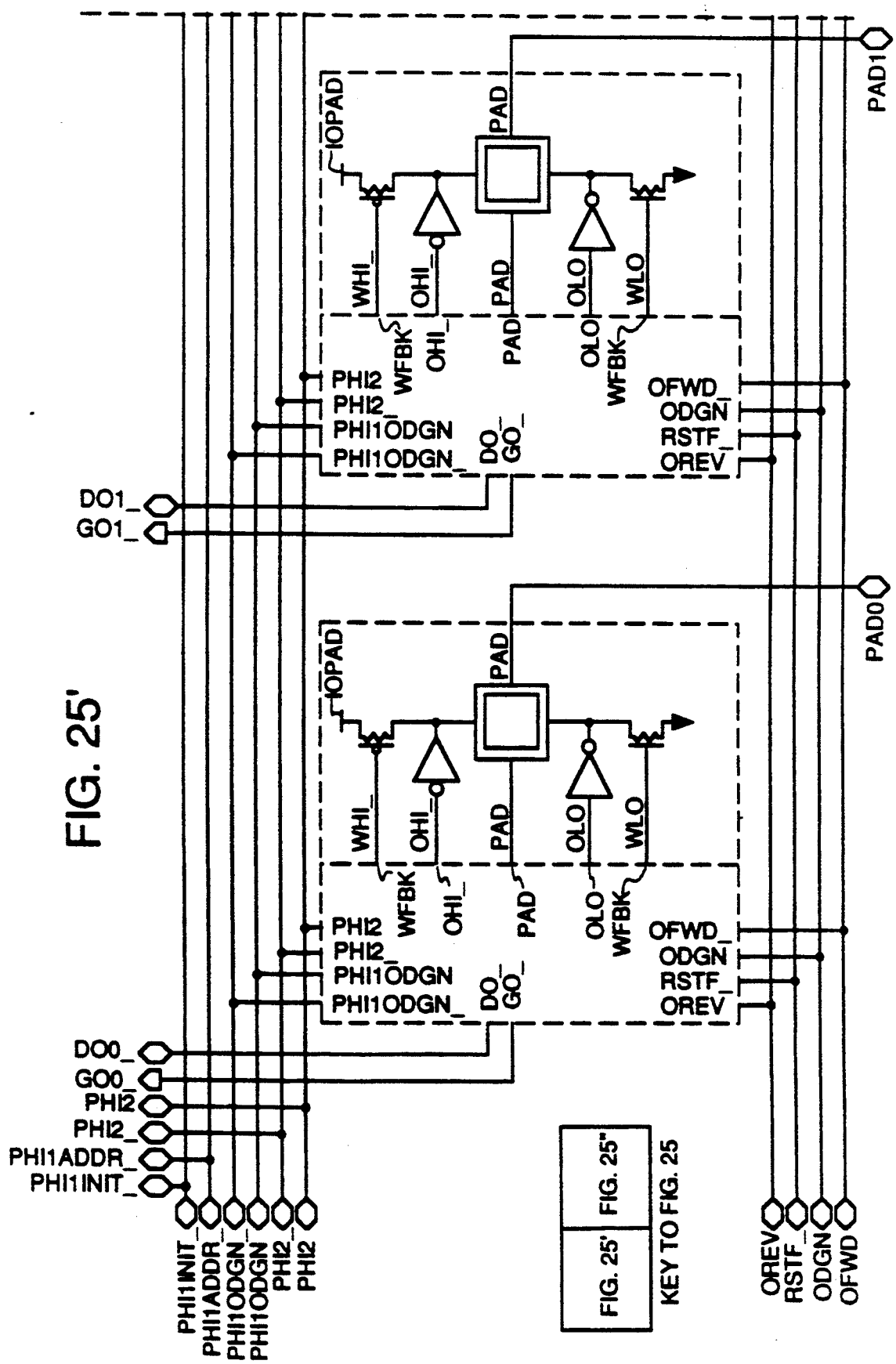

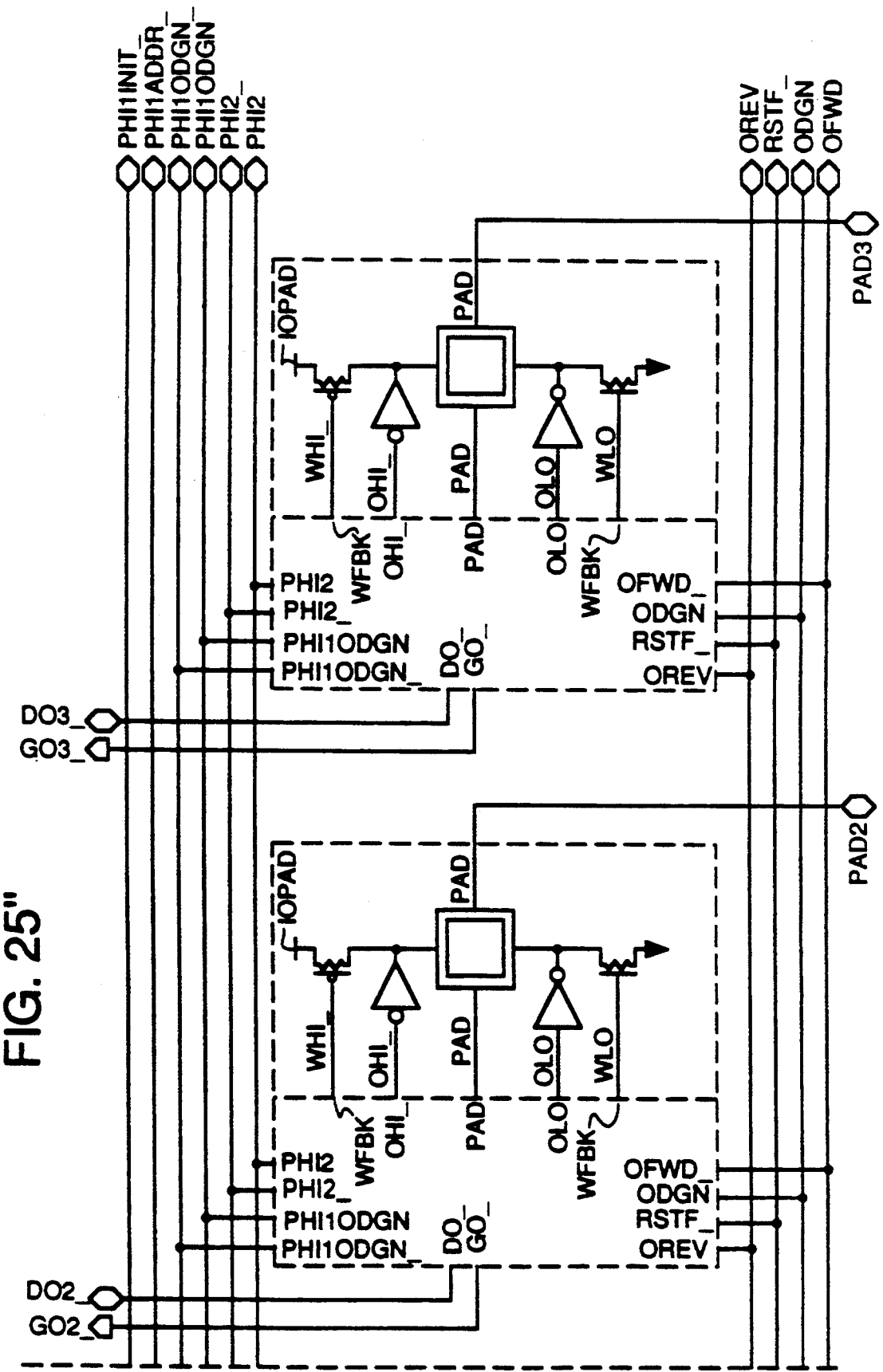
FIG. 25"

ROUTER CHIP WITH QUAD-CROSSBAR AND HYPERBAR PERSONALITIES

This application is a division of application Ser. No. 07/461,551, filed Jan. 5, 1990.

CROSS-REFERENCE TO RELATED APPLICATIONS

The following co-pending applications are assigned to the same assignee of the present application and are related to the present application: "Scalable Inter-Processor and Processor to I/O Messaging System for Parallel Processing Arrays" by John Nickolls et al., filed concurrently herewith and assigned Ser. No. 07/461,492; "Parallel Processor Memory System" by David Bulfer et al., filed concurrently herewith and assigned Serial No. 07/461,567; and "Method of Wiring Router to Reduce Internal Blockage" by Stuart Taylor, filed concurrently herewith and assigned Serial No. 07/461,572. The disclosures of these concurrently filed applications are incorporated herein by reference.

FIELD OF THE INVENTION

This invention relates to switching systems, and more specifically to a switching network used in a parallel data processing system for selectively connecting a plurality of input ports to a plurality of output ports.

BACKGROUND OF THE INVENTION

Parallel processors have been developed that are based on the concurrent execution of the same instruction by a large number of relatively simple processor elements operating on respective data streams. These processors, known as single instruction, multiple data (SIMD) processors, are useful in such applications as image processing, signal processing, artificial intelligence, data base operations, and simulations.

Typically, a SIMD processor includes an array of processor elements and a routing network. The routing network selectively switches the respective outputs of the processor elements to the inputs of other processor elements or to the inputs of input/output (I/O) devices. A typical routing network may be required to selectively connect any of 1024 input terminals to any of 1024 output terminals.

The operations of the processor elements and of the routing network are controlled by a separate control processor in response to instructions and data furnished from a computer subsystem.

One switching method to selectively connect N input terminals to N output terminals uses an N×N crossbar switch, in which there are N×N switches, each of which are controllable to connect one of N horizontal input wires to one of N vertical output wires. For a 1024×1024 switching requirement, this would require over one million switches within the crossbar switch. A much more economical and reliable switching network, which is used in a SIMD processor, is described in International Publication Number WO 88/06764, dated Sep. 7, 1988, based on Application Number PCT/US 88/00456, filed Feb. 16, 1988, which names Grondalski as the inventor. This publication is incorporated by reference. In the SIMD processor described in the Grondalski publication, an array of 32 processor elements are located on a chip and the chips are grouped in pairs. Each processor element includes a processor and an associated memory. Each processor element is capable of processing data one bit at a time (bit mode) or four bits at a time (nibble mode).

A local interconnect network implements a nearest neighbor mechanism whereby a mesh interconnects each processor element within an array with four other processor elements within the array in order to provide rapid communications with one of the four processor elements at any given time.

In the Grondalski device, global routing network implements a random transfer mechanism whereby any processor element in a processor element array can send a message to any other processor element within another or the same array. FIG. 1 shows the routing network described in the Grondalski publication. The routing network comprises three stages 10, 20, and 30, where FIG. 1 shows one of four identical groups of the three stage routing network which operate in parallel. Each of the four groups of the routing network has the capability of switching 1024 processor element chip pair outputs to 1024 processor element chip pair inputs. In the group of switching elements shown in FIG. 1, the outputs of 1024 processor element chip pairs are applied to each of 1024 input terminals of the 16 chips comprising the first stage 10.

In the Grondalski SIMD processor, the message data generated by a processor element within a processor element chip pair is routed through the routing network of FIG. 1 by the use of routing address bits also generated by the processor element. The routing address bits control each of the routing chips in the three stages to route the message data following the router address bits to a specific processor element chip pair input. The format for the router address bits and message bits is shown in FIG. 2.

In FIG. 2, a data stream begins with a header 40 of 23 bits, namely bits (0) through (22), which identify the intended recipient processor element within the processor element chip pair, followed by the message data bits beginning with the bit (23). The header 40 includes three router control fields identified by reference numerals 42, 44, and 46, which control the routing through the switching stages 10, 20, and 30, respectively. Each switching stage 10, 20, and 30 retires one router control field, that is, it does not pass the bits in that field on to the next switching stage or to the recipient processor element chips.

Each router control field begins with protocol bit P which, when asserted, indicates that message bits follow. Special circuitry is described in the Grondalski publication to process this protocol bit P. If the protocol bit P is not received at an input terminal, the switching chips ignore succeeding signals at that input terminal during the message transmit cycle. The four RTR ADRS bits following each protocol bit are the router address bits which are used by the router to establish a switching path through the stage. As an example, assuming the first four RTR ADRS bits of header 40 outputted by a processor element connected to an input of a router chip in the first stage 10 was 0000, as shown in FIG. 1, these four RTR ADRS bits would connect that particular input to the top chip (0) of the second stage 20.

If a switching path is established through all of the three switching stages, a final protocol bit (bit 15) is received by a processor element chip pair connected to an output line of stage 30. In response, the receiving processor element chip pair generates an ACK acknowledgment signal (bit 16), which is transmitted back over the switching path established through the routing network and received by the processor element chip pair which originated the data stream. The processor element chip pair originating the data stream then uses the received ACK signal to clear a flag associated with the processor element chip pair which transmitted the ACK signal so that the message data may then be transferred.

After the flag is cleared, a 6-bit PROC ID processor identification is transmitted over the switching path. The first bit identifies one of the two processor element arrays in the chip pair which contains the processor element to receive the message, and the last five bits identify one of the 32 processor elements on the identified chip. The next bits are the message bits, which are coupled by the processor element chip's internal router control circuit to the receiving processor element.

Referring back to FIG. 1, each of the chips of the first stage 10 retires the first four RTR ADRS bits (1-4) of header 40 to select one of 16 output channels. Each of the 16 output channels, each comprising four wires, is coupled to one of 16 chips comprising the second stage 20. Thus, as many as four inputs to a particular chip in the first stage 10 may be connected to a single chip in the second stage 20.

The next four RTR ADRS bits (6-9) are retired by the second stage 20 to determine to which of the 16 output channels of the second stage chip to route the remaining data stream. Each of the 16 output channels of the second stage 20 is coupled to a 16×16 crossbar switch, a plurality of which comprise the third stage 30, shown in FIG. 1. Each crossbar switch has 16 inputs connectable to 16 outputs. Each of the output terminals of the crossbar switches is coupled to a processor element chip pair containing a total of 64 processor elements. The Grondalski crossbar switching chips are identical to the chips used in the first and second stages except that, in the crossbar chips, three wires in each channel are disabled. Thus, in the Grondalski crossbar switching chips, three-quarters of the chip is effectively disabled and wasted. This inefficient use of the router chips in the third stage requires Grondalski to use four times as many chips in the third stage as are used in the first or second stages.

It would be highly desirable in the field of switching networks for a switching network to not require additional circuitry for processing a protocol bit and for each router chip comprising the switching network to be efficiently configurable as either a switch having 64 inputs and 16 output channels (each channel having 4 wires each) or a crossbar switch comprising four 16×16 crossbar switches so as to not require any more chips in the third stage as is used in either the first stage or the second stage.

SUMMARY OF THE INVENTION

The present invention, in one embodiment, is a routing network capable of simultaneously connecting 1024 input ports to 1024 output ports. The routing network is a three stage system with 16 router chips in each stage, each chip having 64 input terminals and 64 output terminals. Each of the 64 input terminals of the chips in the first stage is connected to receive an output from a respective processor element chip having multiplex data thereon.

Each of the chips in the first and second stages have 64 output terminals arranged in 16 channels having four wires per channel. Each of the 16 output channels from a chip in the first stage is coupled to a separate one of 16 chips comprising the second stage. Thus, any processor element coupled to a chip in the first stage can be connected to any chip in the second stage. Four router address bits within a header preceding a message to be transmitted control logic means within each chip of the first stage to select one output channel of that chip so as to couple the remainder of the data stream to the selected chip in the second stage.

The next four routing address bits in the header are decoded by the second stage to determine to which of sixteen 16×16 crossbar switches in the third stage the message is to be routed. (There is a total of sixty-four 16×16 crossbar switches in the third stage; however, the selection of a particular one of the 16 second stage router chips also implicitly designates a subset of sixteen 16×16 crossbar switches to which the outputs of the selected second stage router chip are connected.) The crossbar switches connect a single input terminal to a single output terminal. The 16 crossbar switching chips in the third stage used in the preferred embodiment are identical to the chips used in the first and second stages, but are each configured prior to use to operate as four 16×16 crossbar switches. The novel circuitry internal to each router chip enables each chip to be configurable as a crossbar switch or a hyperbar switch (i.e., a switch having output channels of multiple wires) in such a way that the same number of routing chips are used in the third stage as is used in either the first stage or second stage.

The four remaining router address bits of the header select a single one of the 16 output terminals of each 16×16 crossbar switch. A further novel feature of the router chip is that the chips do not require any additional circuitry to process a protocol bit, which identifies the existence or absence of a message following the router address bits. This novel feature is accomplished by novel router address decoding circuitry in the router chip which enables the protocol bit to be transmitted as a fifth router address bit so as to disable or not disable, as appropriate, the only remaining output channel selected by the preceding four router address bits.

BRIEF DESCRIPTION OF THE DRAWINGS

FIGS. 13–25 show actual circuitry use in the preferred embodiment of the router chip as follows:

FIG. 13c shows more detail of the router chip input latch pad (latpad), shown in block form in FIG. 13a.

FIG. 13d shows more detail of the router chip input buffer pad (bufpad), shown in block form in FIG. 13a.

FIG. 13e shows more detail of the router chip control latch (clat), shown in block form in FIG. 13a.

FIG. 14 shows circuitry for the router chip input-/output (I/O) pad (iopad) including a strong pull-up/down CMOS device and a weak pull-up/down CMOS device.

FIG. 15 shows circuitry for the router chip I/O buffer (iobuf) for providing signals from the router chip to an associated I/O pad. A hysteresis circuit is also shown coupling an input/signal from the I/O pad to the router chip.

FIGS. 16' and 16" shows circuitry for the router chip input transceiver showing detail of the pipeline latch and other circuitry associated with processing an input signal.

FIG. 17 shows timing diagrams for the clock and data signals for operating the pipeline latch shown in FIG. 16.

FIG. 18 shows circuitry for the router chip input transceiver (ix) for even input bits having associated input terminals on a first side of the router chip.

FIG. 19 shows circuitry for the router chip input transceiver for odd input bits having associated input terminals on a second side of the router chip.

FIG. 20 shows circuitry for the router chip array buffer (abuf) for passing input signals to the data-in and data-out lines of the switch array internal to the router chip.

FIG. 21 shows circuitry for the router chip address decoder latch (alat) for processing routing address bits and for controlling the grant circuits within the switch array to request connection between the data-in lines and the data-out lines.

FIG. 22 shows circuitry in the router chip address decoder cell (adcd) and shows grant circuits connected to the address decoder latch of FIG. 21.

FIG. 23 shows circuitry for the router chip arbitration daisy chain (arb) used in the switching circuitry showing internal circuitry of the grant circuits.

FIG. 24 shows circuitry for the router chip output transceivers (ox) connected to the data-out lines of FIG. 23.

FIGS. 25' and 25" shows circuitry for the router chip quad-output transceivers for an entire channel comprising four output wires.

DETAILED DESCRIPTION OF THE PREFERRED EMBODIMENT

Overview of Preferred Embodiment of Router Network

In the preferred embodiment of the invention, a three-stage routing network is used to provide a selectable communications path between the output terminals of any of 1024 processor element (PE) clusters and the input terminals of any of the 1024 PE clusters, or the input terminals of any of up to 1024 input/output (I/O) device cluster equivalents. A plurality of identical router chips comprise each of the three stages, wherein each router chip is fabricated using double-metal, N-well epitaxial CMOS technology, with CMOS switch devices having 1.6 micron channel lengths, 250 Å gate oxide thicknesses, and polysilicon gates. The die size of each router chip is approximately 302×318 mils. Each router chip has 117,624 logical (154,692 physical) transistors and is packaged in a 164-lead plastic quad flat-pack. The router chip will be described down to its logic gate level with reference to the various figures.

Figure 1:
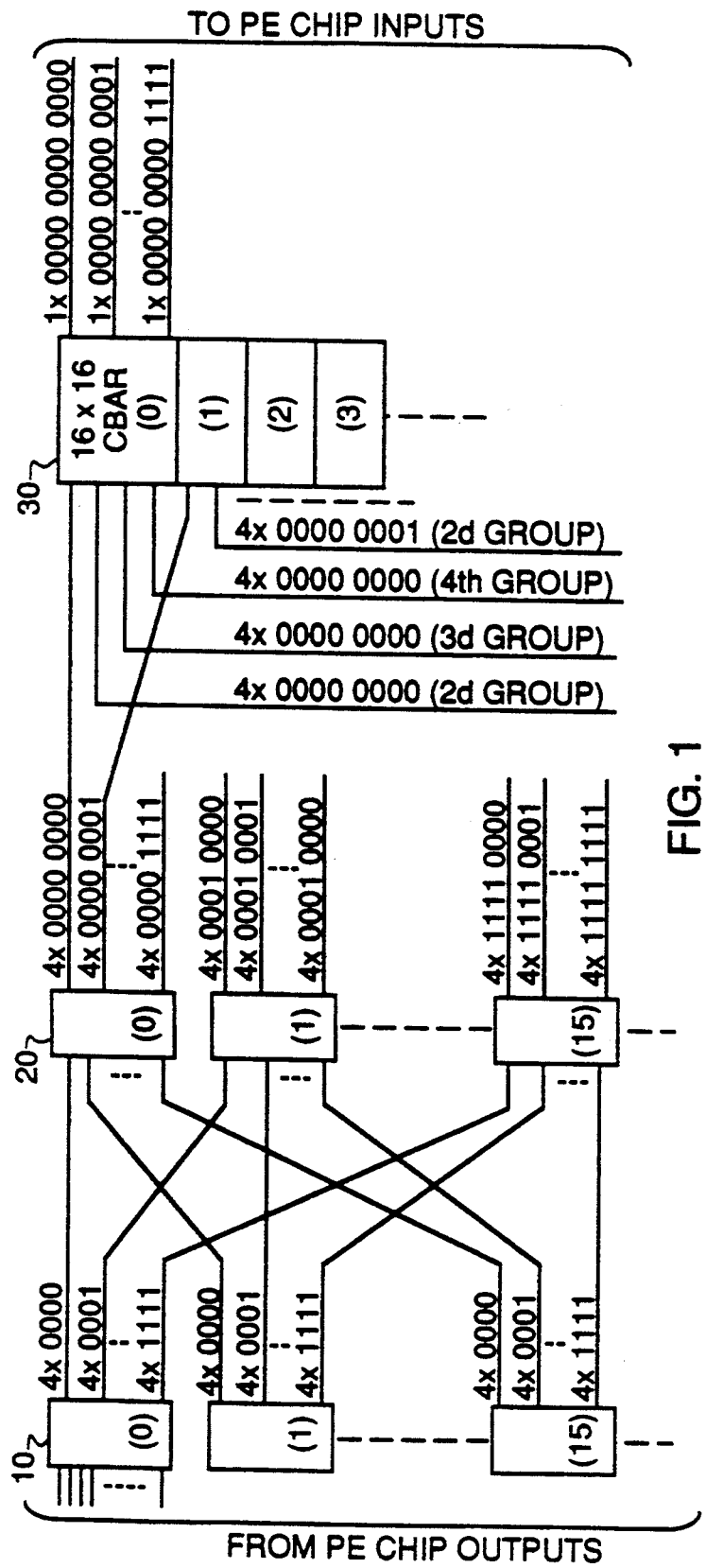
FIG. 1 shows a prior art routing network for a parallel processing system.
Figure 2:
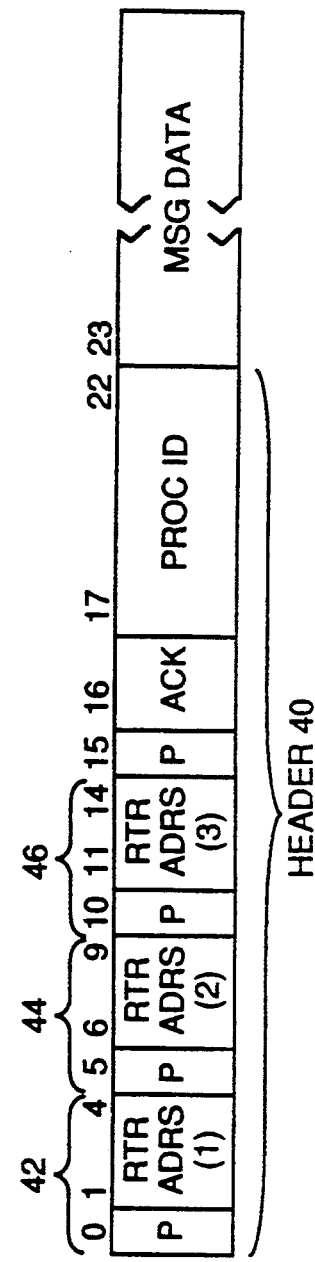
FIG. 2 shows a data stream used in the prior art parallel processing systems for routing a message through the router network of FIG. 1.
Figure 3:
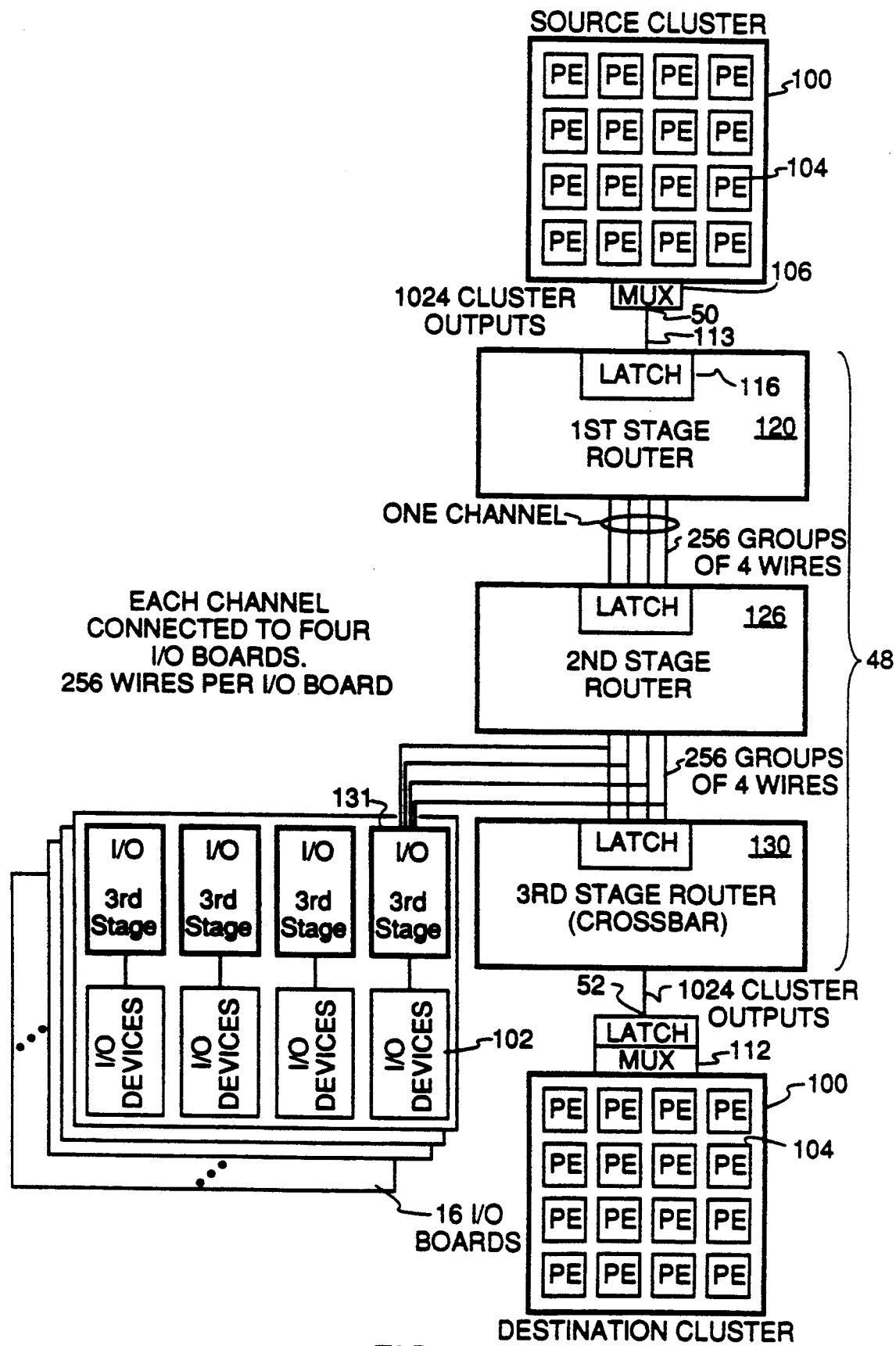
FIG. 3 is a basic block diagram of the routing network in accordance with the preferred embodiment of the invention.

FIG. 3 is a diagram showing the preferred embodiment router network 48 connected so as to provide a selectable communications path between the output terminals 50 of any of the 1024 PE clusters 100 and the input terminals 52 of any of the 1024 PE clusters 100, or the input terminals of any of 1024 I/O device cluster equivalents 102.

In the preferred embodiment, there is provided a parallel array of 16,384 processor elements 104 divided up into 1024 PE clusters 100 of 16 processor elements each. A 16:1 multiplexer 106 is provided at the output of each PE cluster 100 for outputting messages from each processor element 104 within PE cluster 100, and a 1:16 multiplexer 112 is provided at the input of each PE cluster 100 for inputting messages to a selected one of the 16 processor elements 104 within PE cluster 100.

Each PE cluster 100 has a message originating line 113 coupling the PE cluster 100 to a bidirectional first stage pipeline latch 116 located within each router chip and associated with a single input terminal of the router chip. Each pipeline latch 116 is a master-slave equivalent type flip-flop which passes an input signal applied to the pipeline latch 116 to its output on the next clock pulse. The purpose of these pipeline latches 116 is two-fold. A first purpose of the pipeline latches 116 is to segment the electrical connection between itself and an identical pipeline latch located at the input of the next stage. This acts to reduce the distortion of a signal being routed through the router network 48 by lowering the equivalent resistance, capacitance, and inductance of the circuit from what it would be if a completed circuit extended from the output of a PE cluster 100, through the router network 48, and to the input of a PE cluster 100. A second purpose of the pipeline latches 116 is to store an initial state during diagnostic testing of the router network 48 for transmission over the wires between the router network stages to identify any broken wires between the stages. This diagnostics operation will be discussed more fully with reference to FIG. 12.

There are 16 identical router chips in the first stage 120 of router network 48, with each chip having 64 input terminals and 64 output terminals. The outputs of the 64 pipeline latches 116 on each chip in the first stage 120 are applied to a decoder/switch array within the first stage 120 for selectively coupling an input terminal to one of 16 output channels. The internal circuitry of each of these chips will be described later.

The router chips in the first stage 120 and in the second stage 126 are configured to act as hyperbar switches, where the 64 input terminals of each chip are selectively coupled to any of 16 output channels of four wires each. Each of the 16 output channels of a single one of the 16 router chips in the first stage 120 is routed to a separate one of 16 router chips in the second stage 126. Thus, each of the 16 router chips in the first stage 120 is connected to each of the 16 router chips in the second stage 126 by four wires. The router chips of the second stage 126 similarly selectively couple their 64 input terminals to any of 16 output channels of four wires each. Each output channel is connected to a separate one of 16 router chips comprising the third stage 130. The router chips of the third stage 130 are each configured to act as four 16×16 crossbar switches, which will be discussed in detail with reference to FIG. 10.

If a message is to be routed to an I/O device instead of a PE cluster 100, third stage 130 is disabled, and selected crossbar router chips 131 (four per I/O board) associated with the 1024 I/O device cluster equivalents 102 are enabled. The message is then routed by one of the selected crossbar routing chips 131 to a particular one of 1024 I/O device cluster equivalents 102 located on one of 16 I/O boards.

Figure 4:
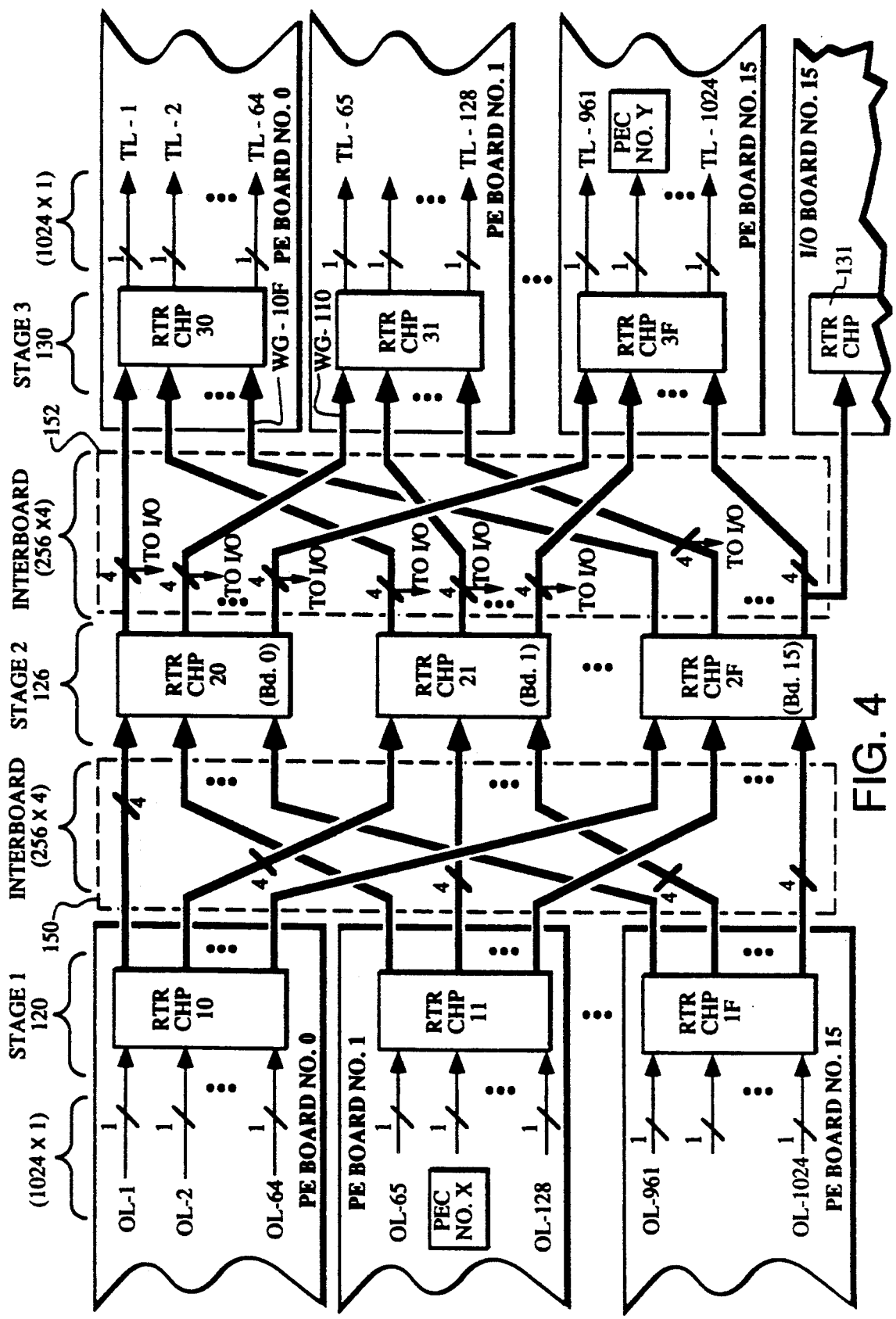
FIG. 4 shows in greater detail the three stages of the routing network, and their interconnections, in accordance with the preferred embodiment of the invention.

Shown in FIG. 4 is a more detailed diagram of the connections between router chip stages 120, 126, and 130. As shown in FIG. 4, 64 PE clusters, each cluster having an originating line OL, are contained on a single board. On this single board also resides a first stage router chip (one of chips 10-1F) having 64 input terminals coupled to the 64 originating lines OL of the 64 PE clusters and a third stage router chip (one of chips 30-3F) having 64 output terminals coupled to the 64 target lines TL leading to the inputs of the 64 PE clusters. The 64 PE clusters are contained within 32 PE chips, with two PE clusters per chip.

Also shown in FIG. 4, are second stage router chips 20-2F, each having 64 input terminals and 64 output terminals, connected to the first and third stage routing chips, respectively, as shown. Each second stage router chip 20-2F is located on one of the 16 boards containing 64 PE clusters, a first stage router chip, and a third stage router chip.

In FIG. 4, the first stage router chip 10 mounted on PE board no. 0 has 64 output pins arranged in 16 channels of four wires each. The 64 wires emerge from the first stage router chip 10 to contact 64 wires of a first inter-board router bus 150 of 1,024 wires. Similarly, each of the remaining 15 first stage router chips 11-1F mounted on PE board nos. 1-15, respectively, are coupled to this first inter-board router bus 150 of 1,024 wires. These first inter-board router bus wires 150 are arranged to couple the 1024 output terminals of the first stage router chips 10-1F to the 1024 input terminals of the 16 second stage router chips 20-2F, as shown in FIG. 4.

The 1024 output terminals of the 16 second stage router chips 20-2F mounted on PE board nos. 0-15, respectively, are coupled to a second inter-board router bus 152, having 1,024 wires. These 1,024 wires of the second inter-board router bus 152 connect the outputs of the second stage router chips 20-2F to the respective inputs of the third stage router chips 30-3F, as shown in FIG. 4. The wires comprising inter-board buses 150 and 152 are formed on a printed circuit backplane on which the 16 PE boards are mounted.

Also indicated in FIG. 4 is the tapping off of each output channel of the 16 second stage router chips for coupling to I/O third stage router chips 131. There are 16 I/O boards, each board containing four I/O third stage router chips 131. Each of the 16 second stage router chips 20-2F has a first group of four channels (256 wires total from second stage 126) connected to respective inputs of four I/O third stage router chips 131 located on a first I/O board. A similar connection of the first group of four channels per each of the 16 second stage router chips 20-2F is made to second, third, and fourth I/O boards. Thus, I/O device cluster equivalents located on each of the first through fourth I/O boards can be connected to receive the same data stream. Only one set of I/O third stage router chips 131 on either the first, second, third, or fourth I/O boards is enabled so that I/O device cluster equivalents located on the enabled I/O board may receive a data stream from a PE cluster.

A second group of four channels from each second stage router chip is similarly connected to respective inputs of four I/O third stage router chips 131 located on fifth, sixth, seventh, and eighth I/O boards. A third and fourth group of four channels is similarly connected to respective inputs of I/O third stage router chips 131 located on ninth through sixteenth I/O boards.

This routing to the I/O devices 102 is accomplished by extending the 1024 wires in the second inter-board router bus 152 for coupling to the various inputs of the I/O third stage router chips 131. A four-wire control bus is used for enabling either the third stage router chips 30-3F associated with the PE board nos. 0-15 or one of the four sets of third stage router chips 131 associated with each group of four channels from the second stage 126.

Thus, the interconnections of the various router chips comprising the first, second, and third stages of router chips have been shown. The internal circuitry and operation of each of the router chips comprising the first, second, and third stages will now be explained.

Description of Internal Circuitry and Operation of Router Chips

Although each of the router chips comprising the first second, and third stages of router chips shown in FIGS. 3 and 4 have identical structures, the router chips comprising the third stage are configured, using internal switching elements, to act as four 16×16 cross-bar switches, while the router chips comprising the first and second stages are configured to operate as hyperbar switches, previously described, connecting 64 input terminals to one of 16 output channels.

Figure 5:
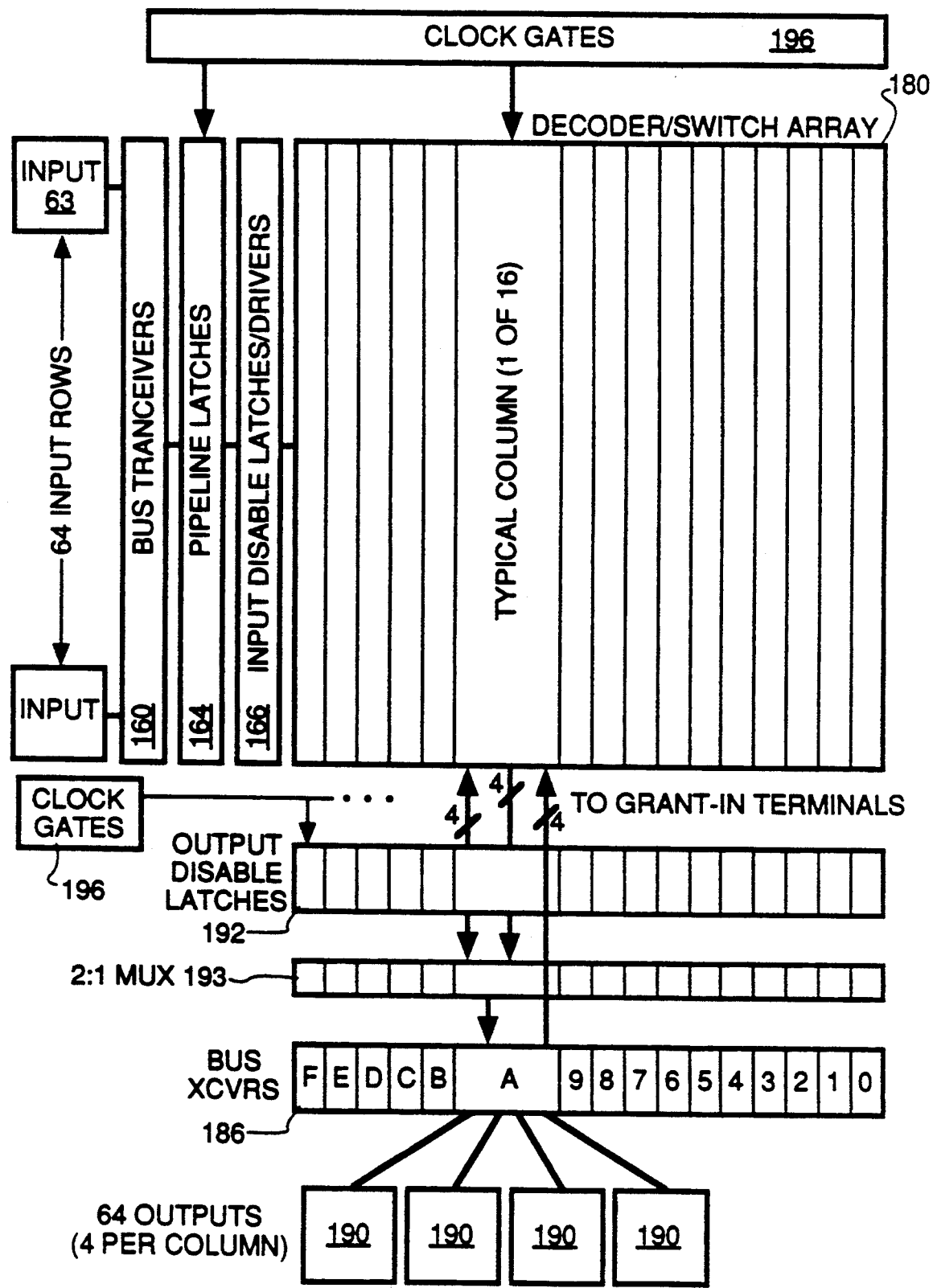
FIG. 5 is a basic block diagram showing the internal circuitry of each of the routing chips in accordance with the preferred embodiment of the invention.

FIG. 5 illustrates the general structure of each of the router chips in the first and second stages as configured in their hyperbar mode of operation.

Each of the router chips has 64 input terminals shown as input terminals 00-63. These input terminals are arranged vertically along opposite sides of the router chip. Each of the input terminals 00-63 is connected to an associated one of 64 bus transceivers, shown collectively as bus transceivers 160. Each transceiver 160 basically comprises two tristate CMOS drivers, where one or the other driver is enabled depending on whether transceiver 160 is to receive a signal from input terminals 00-63 or transmit a signal to input terminals 00-63. The output of each of the 64 bus transceivers 160 is coupled to an input of an associated bidirectional pipeline latch, shown collectively as pipeline latches 164, which retains the incoming digital bit for a single clock pulse to limit distortion of the incoming signal, as previously described with respect to FIG. 3.

The output of each pipeline latch 164 is coupled to an associated input disable latch and an associated bidirectional driver, shown collectively as input disable latches/drivers 166. The input disable latches are loaded during a diagnostic test, which identifies broken wires between boards and, in this capacity, store the contents of an associated pipeline latch 164 to enable or disable the routing address decoding section of the router chip. This feature will be discussed later with respect to FIG. 12.

Assuming the diagnostic test indicates that the particular wire coupled to an input terminal is functional, the output state of the input-disable latch enables the decoder/switch array 180 to receive router address bits to select one of 16 output channels of four wires each. Once such a channel is selected, the data stream then passes through bidirectional tristate drivers 166, and an attempt is made to couple the data stream to a wire within a selected channel. The particular wire of the channel selected is then coupled to an associated tristate bus transceiver, shown collectively as bus transceivers 186. The nominal output of each bus transceiver is coupled to an associated output terminal 190 of the router chip.

Output disable latches 192 are used during diagnostic testing, to be discussed later, and are bypassed via 2:1 multiplexer 193 during a routing operation.

Clock gates 196, controlled by a periodic clock signal, control the switching of the pipeline latches 164, the decoder/switch array 180, and the output disable latches 192.

Figure 6:
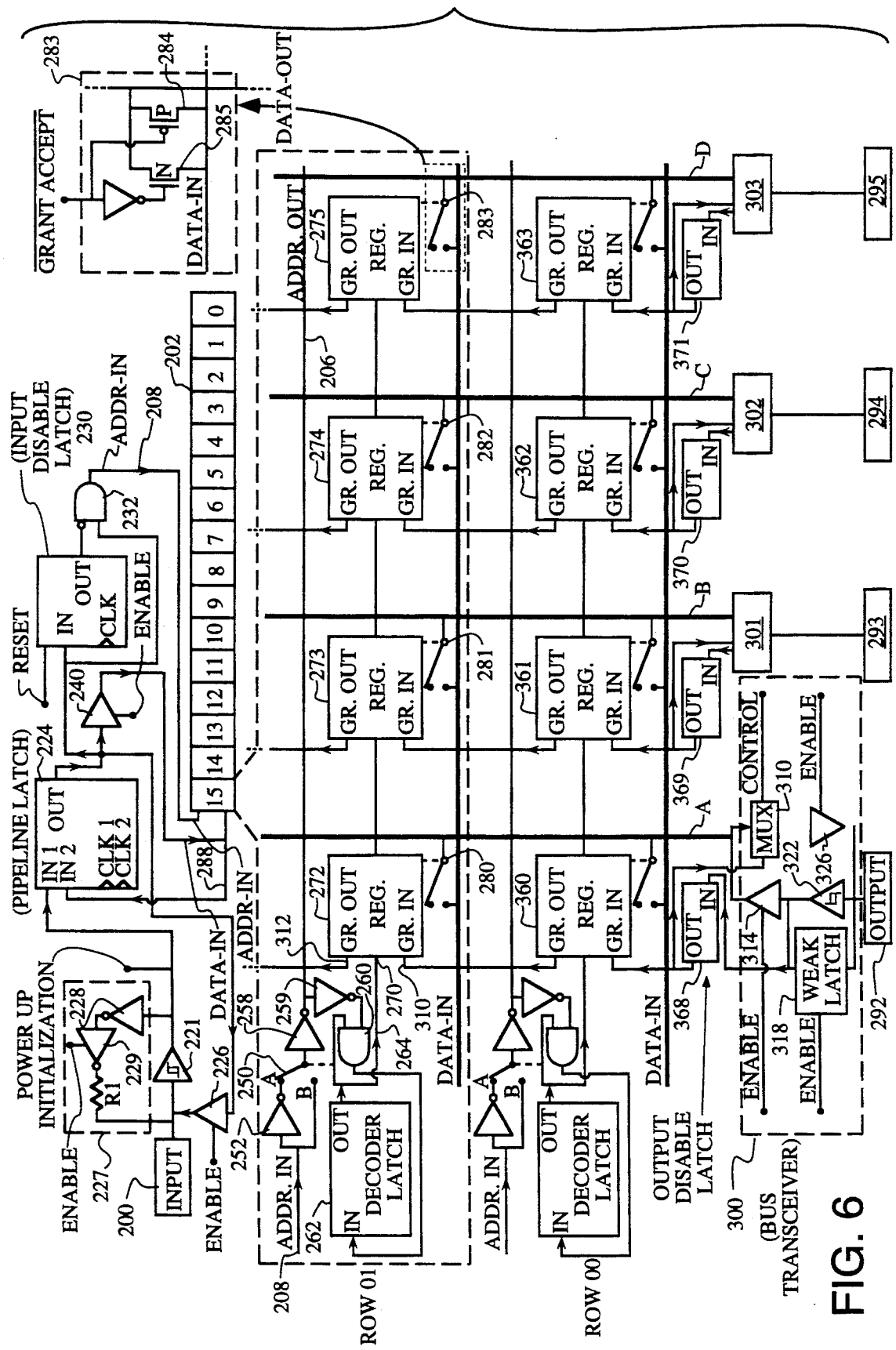
FIG. 6 shows in greater detail the internal circuitry of a single router chip in accordance with the preferred embodiment of the invention.

FIG. 6 shows in more detail the internal circuitry of the hyperbar router chip of FIG. 5, where one input terminal 200 of the 64 input terminals of a router chip is shown along with its associated circuitry. Further shown in FIG. 6 is the channel address decoder section 202 within the decode/switch array associated with input terminal 200, along with the internal circuitry coupled between input terminal 200 and channel address decoder section 202. Also shown is the internal circuitry of one channel within decoding section 202 and the output circuitry coupled between one channel within decoding section 202 and associated output terminals 292-295. The internal channel circuitry is only shown for the first two rows (rows 00 and 01) of the chip, each row being associated with an input terminal. Each of the remainder of the 64 rows (02-3F) in the channel is connected to an adjacent row in the same way row 01 is connected to row 00. All 16 channels are identical, with an address-out line 206 of one channel being coupled to an address-in line 208 of the next channel in that row.

The following discussion of how router address bits applied to input terminal 200 cause a connection to be made between an input terminal and an output terminal assume the diagnostics test performed prior to the operation of the router network resulted in an indication that all wires are functional.

Four routing address bits are required to be first applied to input terminal 200 in order to select one of the 16 channels in the channel address decoder section 202.

Prior to a routing address bit being applied to input terminal 200, tristate buffer 226 (to be described later) and tristate buffer 240 are disabled by an external control signal so that a signal is transmitted in one direction only in the router chip. All enabling/disabling control signals are generated by an array control unit, and all router chips within a stage receive identical control signals.

A hysteresis circuit 221 couples an incoming signal applied to input terminal 200 to a first input of pipeline latch 224. Hysteresis circuit 221 is a bistable device which regenerates at its output a logical 0 or logical 1 signal applied to its input and also raises or lowers its internal threshold level based on its last received signal so that the output of hysteresis circuit 221 is only switched by a subsequent logical 1 or logical 0 signal applied to input terminal 200 and not by random noise on the line. For example, a logical 0 signal applied to input terminal 200 will raise the threshold voltage so that only a logical 1 signal applied to input terminal 200 will cause a change in state of the output of hysteresis circuit 221. Conversely, a logical 1 signal applied to input terminal 200 will lower the threshold voltage of hysteresis circuit 221.

To prevent input terminal 200 from floating when buffer 226 is disabled and when no signal is being applied to input terminal 200, weak latch circuit 227 is used (equivalent circuit shown in dashed line) to weakly maintain the voltage on input terminal 200 at its last voltage level. Floating of an input terminal is undesirable since it may cause both the N and P channel transistors in the associated CMOS circuitry to turn on and draw a static current. To prevent this floating, the output of hysteresis circuit 221 is connected to the input of inverter 228, and the output of inverter 228 is connected to the input of inverter 229. The output of inverter 229 is coupled to the input of hysteresis circuit 221 via a high ohmage resistance R1 (e.g., 10K ohms) to create a feedback circuit. Resistance R1 is supplied by an MOS device having a short channel width. This feedback circuit keeps the voltage at the input of hysteresis circuit 221, and at input terminal 200, at either a high voltage or a low voltage depending on the state of the last signal applied to input terminal 200. The weak feedback signal will easily be switched by a next signal applied to input terminal 200.

A weak latch is also incorporated into the output circuitry (to be described later) of each router chip. Since only one weak latch need be associated with a single inter-board router bus, only the weak latches at the outputs of the second and third stage router chips are enabled, while the weak latches at the inputs and outputs of the first stage router chips are both enabled. Enabling of the weak latches, such as weak latch 227, is performed by enabling inverter 229.

During power-up initialization, a logical 0 is applied to the first input of pipeline latch 224 to initialize the state of pipeline latch 224. Routing address bits are then applied to input terminal 200.

Figure 7:
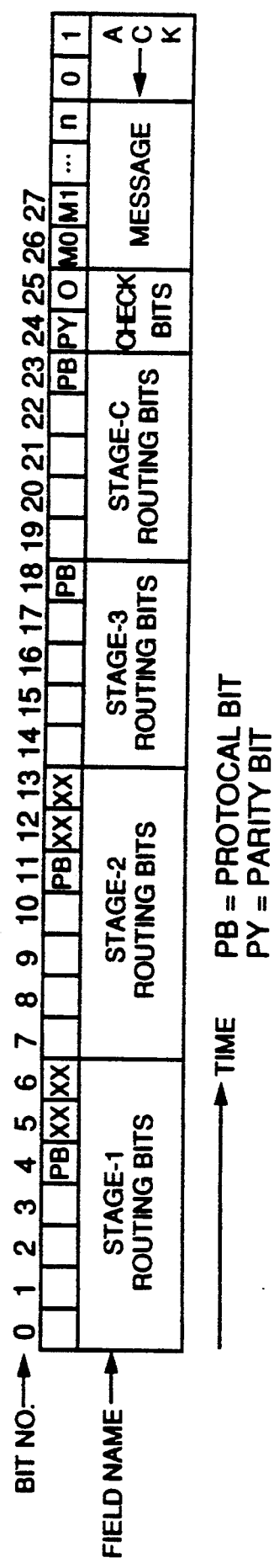
FIG. 7 shows the format of the data stream containing routing and message data in accordance with the preferred embodiment of the invention.

The first router bit applied to input terminal 200, such as router address bit no. 0 shown in the data stream of FIG. 7, enters the first input of pipeline latch 224 and is held for one clock pulse within pipeline latch 224. The clocking for the first input terminal of pipeline latch 224 is controlled by a clock pulse applied to terminal CLK1.

On the next clock pulse, the output of pipeline latch 224 is applied to input disable latch 230 and to one input of AND gate 232. Assuming the previously conducted diagnostic test indicated the wire connected to input terminal 200 is functional, input disable latch 230 would have an output of logical 0. This logical 0 output of latch 230 is inverted at a second input of AND gate 232, and, thus, a logical 1 is effectively applied to that input. This logical 0 output of input disable latch 230 is frozen after the diagnostic test by the cessation of clock signals applied to input disable latch 230 from the array control unit (not shown) and thus remains at logical 0 despite a subsequent change in the level of the output of pipeline latch 224. Since the output of pipeline latch 224 is applied to the other input of AND gate 232, the output of AND gate 232 will be a logical 1 if the output of pipeline latch 224 is a logical 1.

Further details of the clocking and control of pipeline latch 224 are discussed later with respect to FIGS. 16 and 17.

Let us assume the output of AND gate 232 is coupled to the address-in line 208 applied to the input of row 01 of the channel address decoder 202. Row 01 comprises 16 channels, each channel having four output wires A, B, C and D. Only channel 15 of channels 15-0 is shown in detail in FIG. 6. Row 00 is associated with an input terminal directly below input terminal 200 and is the highest priority row, as will be seen.

In the channel selecting mode, switch 250, which is a simple transmission gate, is toggled to position B so as to bypass inverter 252. The position of switch 250 is controlled by the state of decoder latch 262, which is initially set so as to apply a logical 1 output on line 264. The operation of decoder latch 262 will be described below. As previously stated, a first routing address bit outputted from AND gate 232 is applied to the address-in terminal 208 of row 01. Since switch 250 bypasses inverter 252, the level of this first address bit outputted by AND gate 232 is inverted by downstream inverter 258.

The output of inverter 258 is inverted by inverter 259 and applied to one input of AND gate 260. The output of AND gate 260 is applied to the input of decoder latch 262. As previously stated, decoder latch 262 is initially set prior to receiving the first router bit so as to apply a logical 1 output on line 264. Since the logical 1 output on line 264 is also coupled to an input of AND gate 260, AND gate 260 will pass the signal at the output of inverter 259 to the input of decoder latch 262.

A logical 0 input into decoder latch 262 resets the output of decoder latch 262 to a logical 0. Since this logical 0 output of decoder latch 262 is applied to an input of AND gate 260, the output of AND gate 260, and thus the output of decoder latch 262, is prevented from being changed to a logical 1 by subsequent routing address bits applied to address-in line 208 once the decoder latch 262 is reset.

The output of decoder latch 262 is applied to the grant request input 270 of a first of four grant circuits 272-275 associated with that particular row and channel. A logical 1 output of decoder latch 262 signals to grant circuit 272 that the channel is to remain enabled for possible selection. A logical 0 output of decoder latch 262 signals that the channel is to be disabled for this row as it will not be selected by the four routing address bits.

After the first routing address bit has been decoded by decoder latch 262, if the decoder latch is set to a logical 0, switch 250 is toggled to position A so as not to bypass inverter 252. Thus, the routing address bit applied to address-in line 208 will not be inverted at the output of inverter 258.

Each of the 16 channels uses internal circuitry identical to that shown in FIG. 6, wherein the address-out line 206 coupled to the output of inverter 258 is applied to the address-in terminal of the next channel. Thus, initially, with switch 250 in position B bypassing inverter 252, the first router address bit applied to address-in terminal 208 will be inverted when applied to the address-in terminal of the next channel (i.e., channel 14). Since all 16 columns are identical, each having a switch identical to switch 250 in position B, the decoder latches in channels 15-0 will have outputs which are of an opposite state as the decoder latch output in an adjacent channel. This is clearly illustrated in FIG. 8, where the states of the decoder latches are shown in channels 15-0.

Figure 8:
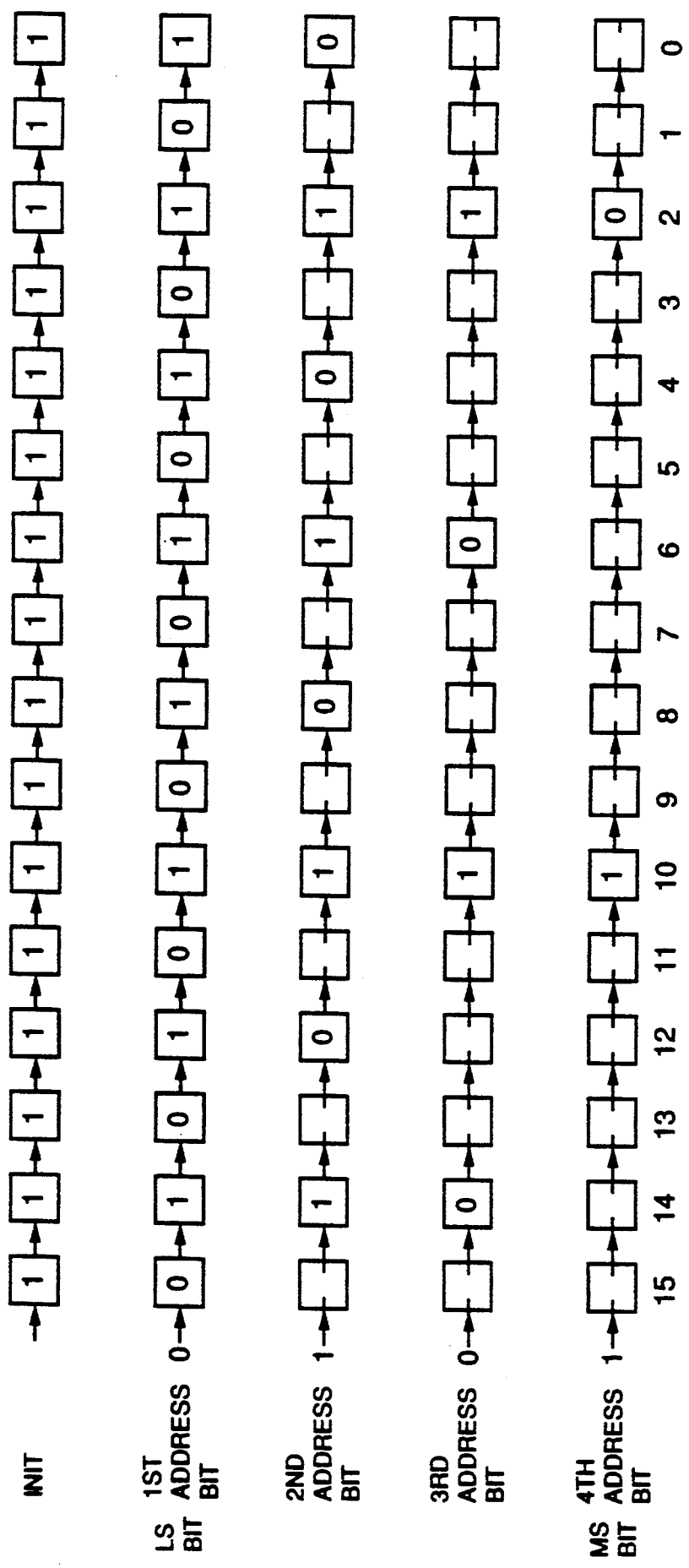
FIG. 8 illustrates the operation of the address decoding circuitry in accordance with the preferred embodiment of the invention.

FIG. 8 shows all 16 decoder latches 262 in a single row of 16 channels being initially set to a logical 1 state. Assuming a first router address bit outputted from AND gate 232 in FIG. 6 is a logical 0 signal, the decoder latches 262 in channels 15-0 will have alternate output states as shown in FIG. 8 after the first routing address bit has been retired by the row. The channels associated with the decoder latches having a logical 0 output are disabled due to a logical 0 being applied to the grant request terminal of the first grant circuit in each of the non-selected channels. The decoder latches having an output of a logical 0 control associated switches, identical to switch 250 in FIG. 6, to switch to position A so that the remaining routing address bits are not inverted by those channels which were not selected.

Assuming the second router address bit is a logical 1, the decoder latches in channels 14, 10, 6, and 2 would have a logical 1 output and those channels would remain enabled.

Assuming the third router address bit is a logical 0, as shown in FIG. 8, only channels 10 and 2 will remain enabled.

Upon propagation through the row of a fourth router address bit of a logical 1, only channel 10 will remain enabled to connect the particular input terminal for that row to one of the four output wires A, B, C and D associated with the selected channel.

Referring back to FIG. 6, after a single channel in a row is selected, a logical 1 signal from the decoder latch associated with the selected channel will be applied to the grant request input of the first grant circuit associated with the selected channel. Since there are only four wires per channel, no more than four of the 64 input terminals of the router chip may use the same channel at the same time. Those input terminals which could not be connected to one of the four wires of a selected channel will not be connected in the present message cycle and will have to try again during the next message cycle.

To determine the priority of which input terminal gets connected to one of the four wires within a selected channel so as to connect an input terminal of a router chip to an output terminal, the below-described circuitry is used.

Each of the grant circuits 272-275 in row 01 of FIG. 6 controls associated switches 280-283 to connect data-in line 288, associated with a particular input terminal, to one of four data output lines A, B, C and D, each associated with a particular output terminal 292-295, respectively. Each of switches 280-283 comprise a P channel transistor 284 and an N channel transistor 285 connected in parallel, as shown within the dashed box proximate to switch 283. A $\overline{\text{grant accept}}$ control signal generated by an associated grant circuit is applied to the control terminal of P channel transistor 284 while an inverted $\overline{\text{grant accept}}$ control signal (i.e., a grant accept control signal) is applied to the control terminal of N channel transistor 285. As seen, a logical 0 grant accept signal causes an associated switch 280-283 to couple a vertical data-out line (e.g., output line A, B, C, or D) to a horizontal data-in line (e.g., data-in line 288).

Bus transceivers 300-303 are coupled between data output lines A, B, C, and D and output terminals 292-295, respectively. Each bus transceiver 300-303 comprises a multiplexer 310, a tristate buffer 314, a weak latch 318, a hysteresis circuit 322, and a strong pull-up/down tristate buffer 326, connected as shown in FIG. 6. The construction of weak latch 318 and hysteresis circuit 322 is similar to the construction of weak latch 227 and hysteresis circuit 221, previously described. While the router chip is in the forward transmission mode, where a signal is to be communicated from input terminal 200 to any of the output terminals 292-295, tristate buffer 314 is disabled, while multiplexer 310 is controlled to regenerate a signal on the various data-output lines A-D, and buffer 326 and weak latch 318 are enabled for all output terminals.

Output disable latch 368 is used in diagnostic testing to test for broken wires between chips. Output disable latch 368 has an input terminal coupled an output of hysteresis circuit 322 and has an output terminal coupled to one input of multiplexer 310 and to a grant-in terminal of an associated grant circuit. The operation of output disable latch 368 will be discussed later with respect to FIG. 12.

When there is both a logical 1 signal applied to the grant-in terminal 310 of grant circuit 272 and a logical 1 signal applied to the grant request terminal 270 of grant circuit 272, grant circuit 272 controls its associated switch 280 to couple the data-in line 288 to the vertical data output line A so as to connect the input terminal associated with row 01 to output terminal 292. The logic means incorporated into each of the grant circuits prevents all other lower priority grant circuits (i.e., those grant circuits in rows 02-63) within the router chip associated with that particular output wire from also switching a data-in line to that particular output wire.

Figure 9:
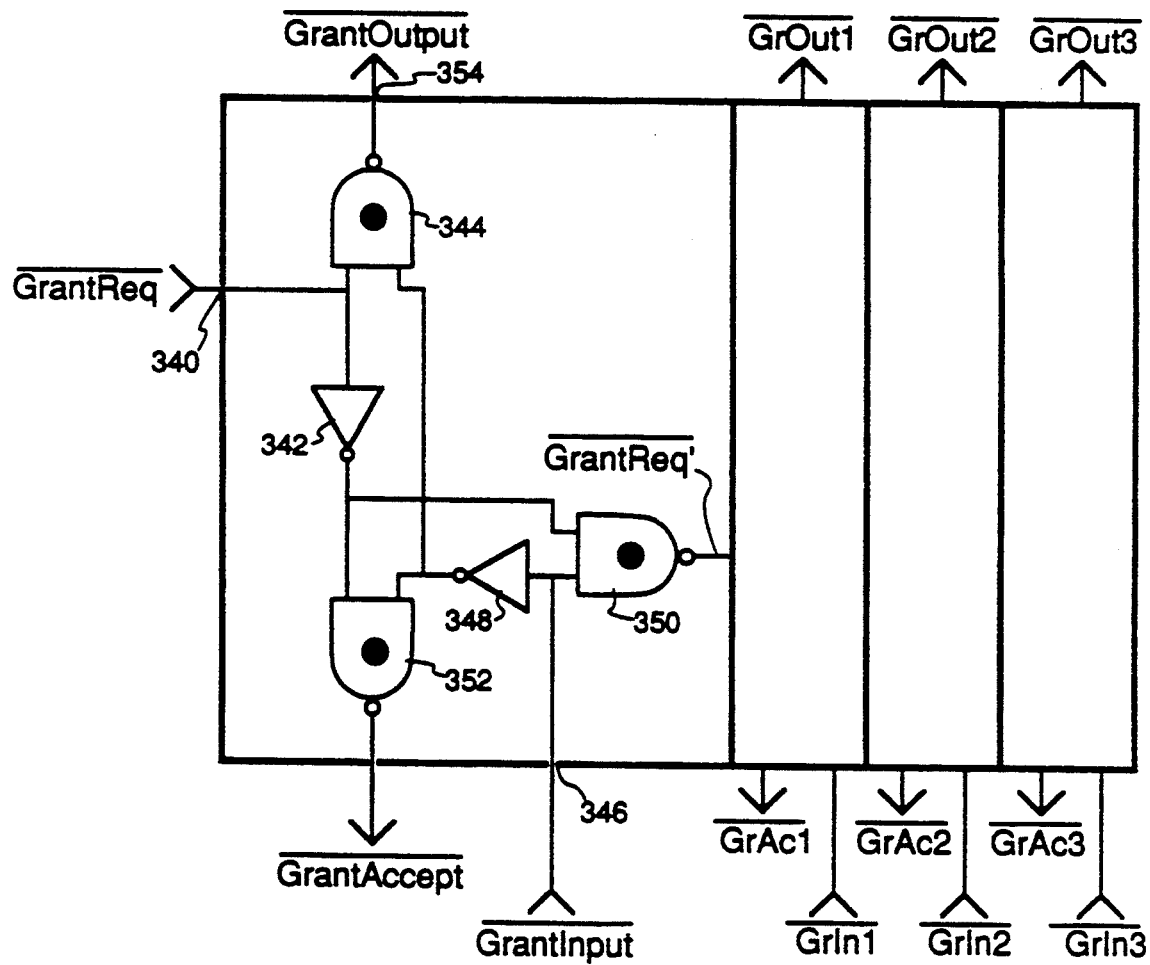
FIG. 9 shows the internal circuitry of the granting circuitry used in the switching array of each router chip in accordance with the present invention.

FIG. 9 shows the logic means within each of the grant circuits used in the router chips. The grant circuit logic means shown in FIG. 9 exhibits the following truth table.

TABLE I

| Grant-In | Grant Request | Grant Accept | Grant-Out | Grant Request' |
|---|---|---|---|---|
| 0 (enabled) | 0 (connection requested) | 0 (make connection) | 1 (disable higher rows) | 1 (no request for next grant circuit to make connection) |
| 1 (disable) | 1 (no connection requested) | 1 (do not make connection) | 1 | 1 |
| 0 | 1 | 1 | 0 (do not disable higher rows) | 1 |
| 1 | 0 | 1 | 1 | 0 |

TABLE I-continued

| Grant-In | Grant Request | Grant Accept | Grant-Out | Grant Request' |
|---|---|---|---|---|
| | | | | (request next grant circuit to make connection) |

In the logic means of FIG. 9, the grant request terminal 340 of a grant circuit, such as grant circuit 272 in FIG. 6, is coupled to the input of inverter 342 and to one input of NAND gate 344. The grant input terminal 346 of the grant circuit is coupled to the input of inverter 348 and to one input of NAND gate 350, whose output is coupled to a grant circuit associated with the next wire in the channel.

The outputs of inverters 342 and 348 are applied to the inputs of NAND gate 352, whose output is used to toggle a switch, such as switch 280 in FIG. 6, to connect a data-in line to a data-out line associated with a particular output terminal of the router chip.

The output of inverter 348 and the signal applied to the grant request terminal 340 is coupled to the inputs of NAND gate 344, whose output at grant-out terminal 354 is applied to the grant-in terminals of the grant circuit in the next higher (i.e., lower priority) row.

As seen from Table I, if the $\overline{\text{grant-in}}$ signal and $\overline{\text{grant request}}$ signal are both logical 0, the grant is accepted (i.e., $\overline{\text{grant accept}}$=0), and the grant circuit controls a switch, such as switch 280, to make a connection between an input terminal and an output terminal of the router chip. Since the grant is accepted, the grant request will not be passed on to the next grant circuit in the channel (i.e., $\overline{\text{grant request}}$=1). Also, since the grant is accepted, the $\overline{\text{grant-out}}$ signal on terminal 354 in FIG. 9 will be a logical 1, disabling all grant latches in the higher rows associated with that output wire.

Also as seen in Table Z, if a $\overline{\text{grant-in}}$ signal into the grant circuit is a logical 1, the grant circuit is disabled and will output a logical 1 $\overline{\text{grant-out}}$ signal, disabling the grant circuits in the higher rows associated with that output wire.

A logical 0 $\overline{\text{grant-out}}$ signal applied to the grant-in terminal 346 indicates that no grant circuit in the lower rows associated with that wire has accepted a grant, and thus the grant circuit remains available to accept a grant upon receiving a logical 0 $\overline{\text{grant request}}$ signal.

If a grant circuit is disabled, it will pass a logical 0 $\overline{\text{grant request}'}$ signal to the next grant circuit in that row. If all grant latches in that row are disabled, a connection will not be made, and the PE cluster will have to wait for the next message cycle to request a connection.

FIG. 6 shows the bottom row 00 associated with a bottom input terminal of a routing chip, wherein this bottom input terminal is given the highest priority due to its position. To the grant-in terminals of each of the grant circuits in this bottom row (four of which are identified as grant circuits 360-363) is applied a logical 0 grant-in signal from associated output disable latches (four of which are identified as latches 368-371) whose outputs remain constant for the entire message cycle. Thus, the grant circuits in the bottom row 00 have the highest priority, since they can be disabled only if the output of an output disable latch is a logical 1 grant-in signal in response to the detection of a broken wire connected to the output terminal associated with that output disable latch.

Thus, as seen, this granting technique is used to enable a maximum of four input terminals to be connected to the same output channel. To prevent the higher priority input terminals from accessing higher priority input terminals in subsequent stages, the inter-board wires between the first and second stages shown in FIG. 4 are arranged so that the output terminals associated with higher priority wires are coupled to the lower priority input terminals in the next stage of router chips.

The timing of the router address bits is such as to allow the various grant circuits in all the channels to switch prior to a next router address bit being received by the decoder latches. The data stream format of FIG. 7 shows bit positions 5, 6, 12, and 13 empty to allow the various grant latches in a router chip to settle after the channels are selected.

After the four router address bits, which select one of 16 channels in each row, are retired by the router stage, a protocol bit, shown as protocol bit PB in FIG. 7, is transmitted to indicate the presence or absence of a message existing at the end of the router address header.

In the prior art, the presence or absence of a message is indicated by the value of a protocol bit which precedes the routing address bits. In these prior art methods, additional circuitry is provided within the router chip for the detection of this protocol bit and to enable or inhibit the decoding means within the router chip as appropriate.

In the present invention, no additional circuitry is necessary for the handling of this protocol bit which follows the four routing address bits.

After the four address bits have been decoded, and only one decoder latch per row remains set to provide a logical 1 input into the grant request terminal of a grant circuit, the reception of the protocol bit causes the remaining set decoder latch to either be cleared (i.e., output a logical 0) or remain set. If it remains set, this indicates the presence of a message, and the decoder latch will maintain its request for a connection between the row's data-in wire and one of the output wires in the selected channel. For example, if the protocol bit is a logical 1 and only decoder latch 262 in FIG. 6 is set, back-to-back inverters 258 and 259 will cause a logical 1 signal to be applied to the input of decoder latch 262, and the decoder latch 262 will thus continue to provide an enabling logical 1 signal to grant circuit 272.

After this protocol bit is sent and the designated switches (e.g., switch 280 in FIG. 6) have connected the various data-in lines to the appropriate vertical data-out lines, tristate buffer driver 240 coupled to the output of pipeline latch 224, shown in FIG. 6, is enabled, and the remaining data stream is coupled from the output of tristate buffer 240 to its associated data-in line 288. External control means are used to count the four router address bits and the protocol bit so as to only enable tristate buffer driver 240 after all the switches (e.g., switch 280) in the router chip are properly set. No further clock pulses are sent to the decoder latches (e.g., decoder latch 262) from the array control unit (not shown), so the output of the decoder latches are frozen.

Tristate buffer 326 within the output bus transceivers (four of which are identified as 300–303) is enabled at this time for transmitting the data stream to the next stage or to the receiving PE cluster. Tristate buffer 326 comprises a CMOS driver having transistors with wide channels so as to ensure the logical signals at the output terminals of the routing chips will be of a full high or full low voltage and of sufficient current to drive circuitry coupled to the output terminals. Thus, the remainder of the data stream is applied to the appropriate output terminal of the router chip.

The remaining router address bits in the data stream are then applied to the selected input terminals of a router chip of the next stage of router chips to select a channel coupled to a selected one of the 16 router chips in the third stage. Thus, four router address bits plus a protocol bit are retired by the first stage of router chips, and four router address bits plus a protocol bit are retired by the second stage of router chips. The third stage, comprises 16 router chips, each configured to act as four 16×16 crossbar chips for connecting an input terminal to a specific output terminal of the crossbar chip. This is determined by the resolution of four additional router address bits plus a protocol bit. The configuration of the crossbar switch in the router chips of the third stage will now be described.

Configuration of Cross-Bar Routing Chip

Figure 10:
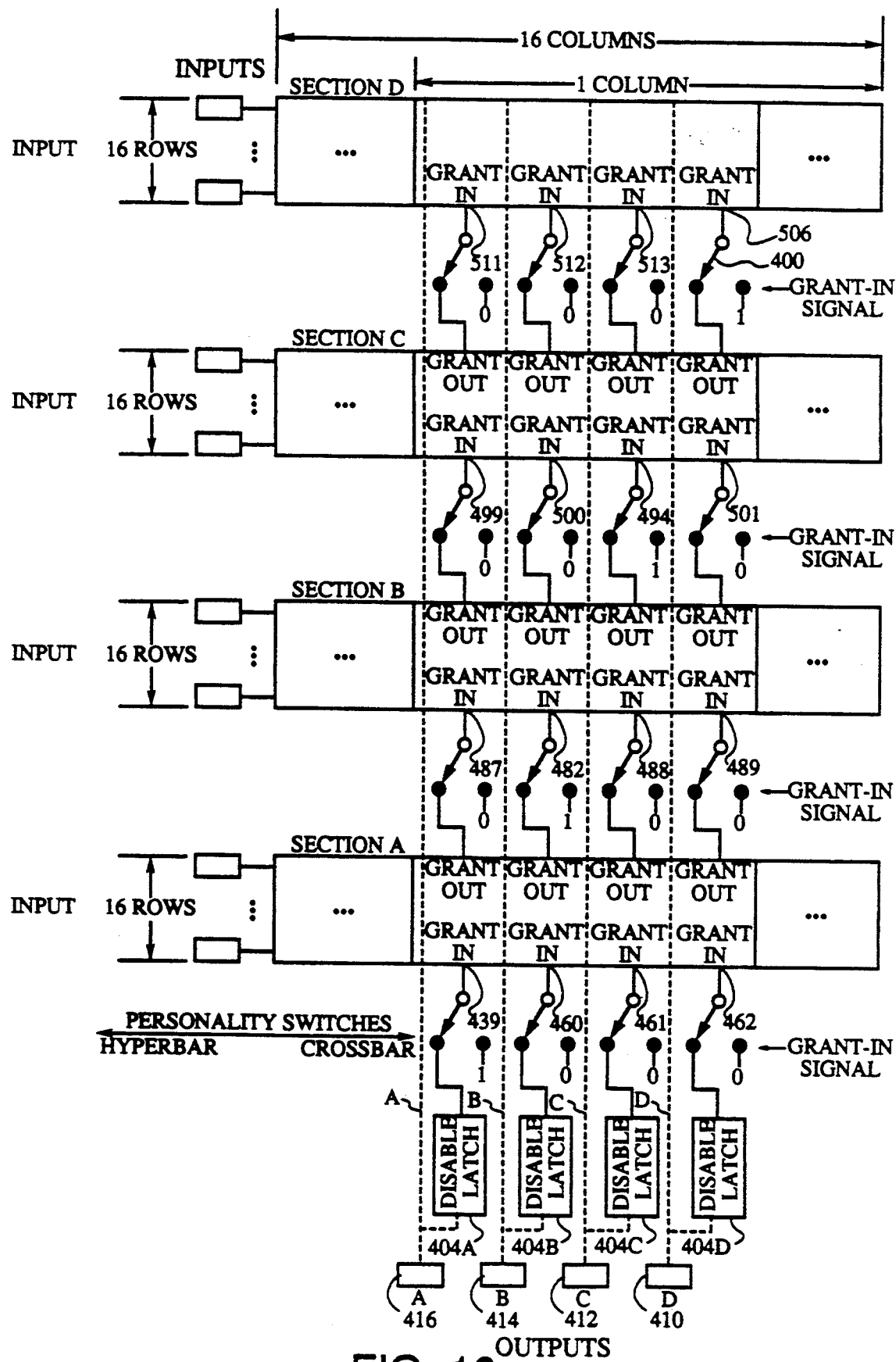
FIG. 10 illustrates the personality switches within each router chip used to convert a router chip from a hyperbar chip to a crossbar chip in accordance with the preferred embodiment of the invention.

FIG. 10 shows the preferred circuitry within the decoder/switch array of a routing chip for configuring a routing chip to act as a hyperbar chip or a crossbar chip. Grant circuits for only one channel are shown; however, the same circuitry exists for all 16 channels within the router chip. Shown in FIG. 10 are various switches 400 connecting the grant-in terminals of grant circuits in the lowest rows of sections A, B, C and D within the router chip to either a fixed logic level (crossbar personality) or to the grant-out terminals of grant circuits in the highest rows of sections A, B, and C (or to the outputs of output disable latches 404A–404D in the case of the lowest row of grant circuits in section A) (hyperbar personality). By toggling switches 400 to the right, the router chip is configured from a hyperbar chip to a crossbar chip.

The 64 rows of grant circuits are arranged in four sections A, B, C, and D of 16 rows per section, each row being associated with a single input terminal of the router chip. The difference between the crossbar personality of the router chip and the hyperbar personality described with respect to FIG. 6 is that, in the crossbar personality mode, only one out of the four output wires of each channel is enabled for each of sections A, B, C, and D, with each section A, B, C, and D having a different one of the four wires enabled. Thus, in each of the four sections A, B, C, and D, only one wire per channel is available for connection to one of the 16 input terminals associated with that section.

This crossbar personality configuration is accomplished by switching the grant-in terminals of three of the four bottom grant circuits associated with each channel in sections A, B, C, and D to a logical 0 signal (i.e., $\overline{\text{grant-in}}=1$ in Table I) to disable these three grant circuits and the remaining grant circuits associated with the same output wires in that section. The grant-in terminals of the bottom grant circuits associated with the remaining wire in the channels are coupled to a logical 1 signal (i.e., $\overline{\text{grant-in}}=0$ in Table I) to enable those grant circuits and the remaining grant circuits associated with that wire in that section.

Thus, in the single channel explicitly shown in FIG. 10, only the grant circuits in section D associated with output wire D and output terminal 410 will be enabled for switching to an input terminal connected to section D in the crossbar personality router chip. Similarly, in section C, only grant circuits associated with wire C and output terminal 412 will be enabled. In section B, only grant circuits associated with wire B and output terminal 414 will be enabled. And, in section A only grant circuits associated with wire A and output terminal 416 will be enabled.

In each of the other 15 channels in sections A, B, C, and D, only grant circuits associated with one wire are enabled in the same way as the channel illustrated in FIG. 10.

In the router chip's crossbar personality, each of the sections A, B, C, and D can only access 16 of the 64 output terminals of the crossbar chip, where each of the output terminals is associated with a particular one of the four sections A, B, C and D. Thus, by using the crossbar router chips in the third stage, a specific output terminal of a third stage router chip connected to the input of a PE cluster may be selected for connection to an input terminal of the third stage router chip.

Shown in FIGS. 11a–11d are circuit diagrams of the switches 400, shown in FIG. 10, connected between the various sections A, B, C, and D.

Figure 11A:
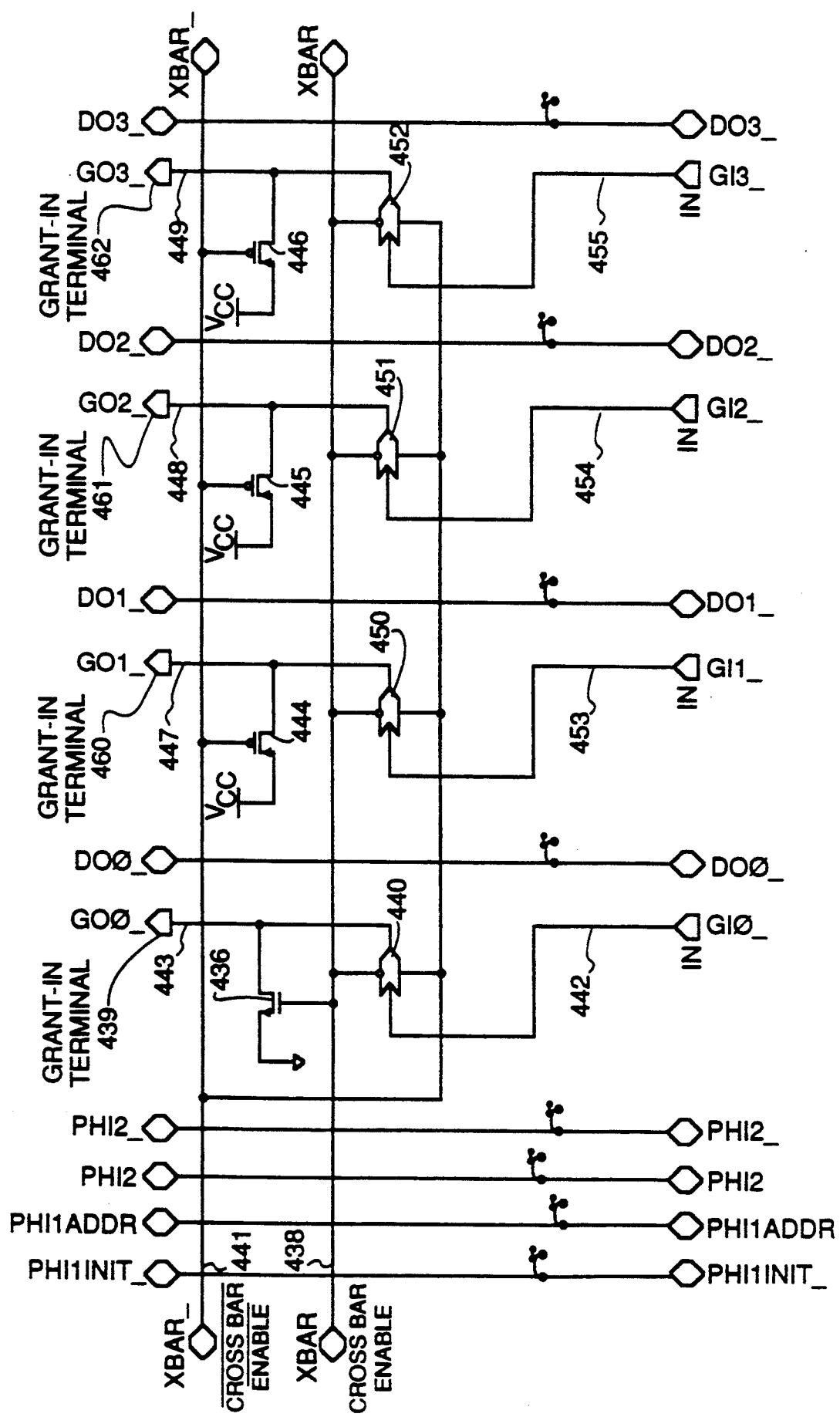
FIG. 11a–11d shown the preferred circuitry for the personality switches illustrated in FIG. 10.

FIG. 11a illustrates the switches coupling the four output disable latches 404A–404D in FIG. 10 to the grant-in terminals of the four bottom grant circuits in section A. The same circuitry is used for the remaining 15 channels in the router chip. N channel transistor 436 in FIG. 11a is shown having a control terminal coupled to crossbar enable wire 438 and having terminals connected between grant-in terminal 439 of the bottom grant circuit associated with output wire A in FIG. 10 and ground. Also shown in FIG. 11a is transmission gate 440, where a control terminal of a P channel transistor is shown coupled to crossbar enable wire 438, and a control terminal of an N channel transistor is coupled to crossbar enable wire 441. Transmission gate 440 is coupled between input wire 442 and output wire 443, which is coupled to grant-in terminal 439. Thus, when crossbar enable wire 438 is at a logical 1 level, transistor 436 will couple output wire 443 (output wire 443 conducts the grant-in signal discussed with respect to Table I) to ground, while transmission gate 440 will be non-conductive and isolates input wire 442 from output wire 443. Consequently, when crossbar enable wire 438 is at a logical 1 level, the grant-in signal on output line 443 will be a logical 0 and, as seen in Table I, causes the grant circuits in section A associated with output terminal 416 to be enabled.

It is to be noted that the signals to which switches 400 in FIG. 10 are coupled are grant-in signals, which are the inverse of the grant-in signals on output lines 443, 447, 448, and 449 in FIG. 11a.

The remainder of the switches 444–446 in FIG. 11a are P channel types having control terminals connected to crossbar enable wire 441 and having terminals connected between output wires 447–449, respectively, and supply voltage $V_{cc}$. Transmission gates 450–452 connect output wires 447–449 to input wires 453–455, respectively.

Consequently, when crossbar enable wire 441 is at a logical 0 level, P channel transistors 444–446 couple output wires 447–449 to a high voltage. This high level (representing the grant-in signal) is coupled to grant-in terminals 460–462 of the three remaining grant circuits in the bottom row of section A in FIG. 10 so as to disable these grant circuits in accordance with the truth table of Table I.

Thus, as shown, a logical 1 crossbar enable signal on wire 438 will enable only one grant circuit in section A per channel and will disable the remaining three grant circuits in the channel. Conversely, a logical 0 signal on crossbar enable wire 438 will render non-conductive all transistors 436, 444, 445, and 446 in FIG. 11a and render conductive all transmission gates 440, 450, 451, and 452 so as to connect input lines 442, 453, 454, and 455 to output lines 443, 447, 448, and 449, respectively. In this state, the router chip will be in its hyperbar personality, as discussed with respect to FIG. 6.

Figure 11B:
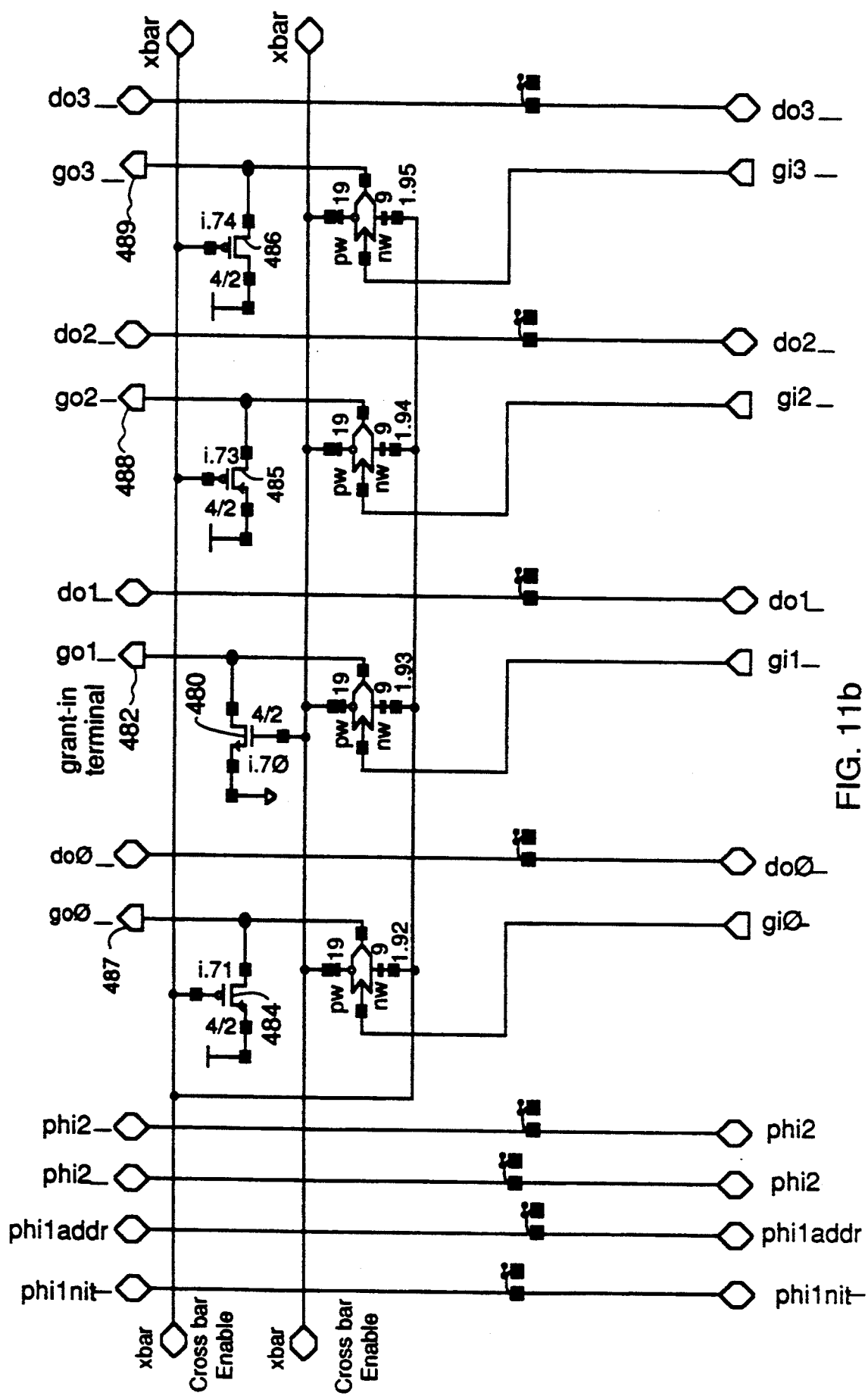

The switch array of FIG. 11b coupled between sections A and B in FIG. 10 is constructed so that N channel transistor 480 is associated with grant-in terminal 482 in section B. As seen from FIG. 10, this will cause grant circuits in section B associated with output wire B to be enabled in the crossbar personality mode. P channel transistors 484–486 are associated with grant-in terminals 487–489, respectively, shown in FIG. 10 so as to render the grant circuits associated with output wires A, C, and D disabled in the crossbar personality mode.

Figure 11C:
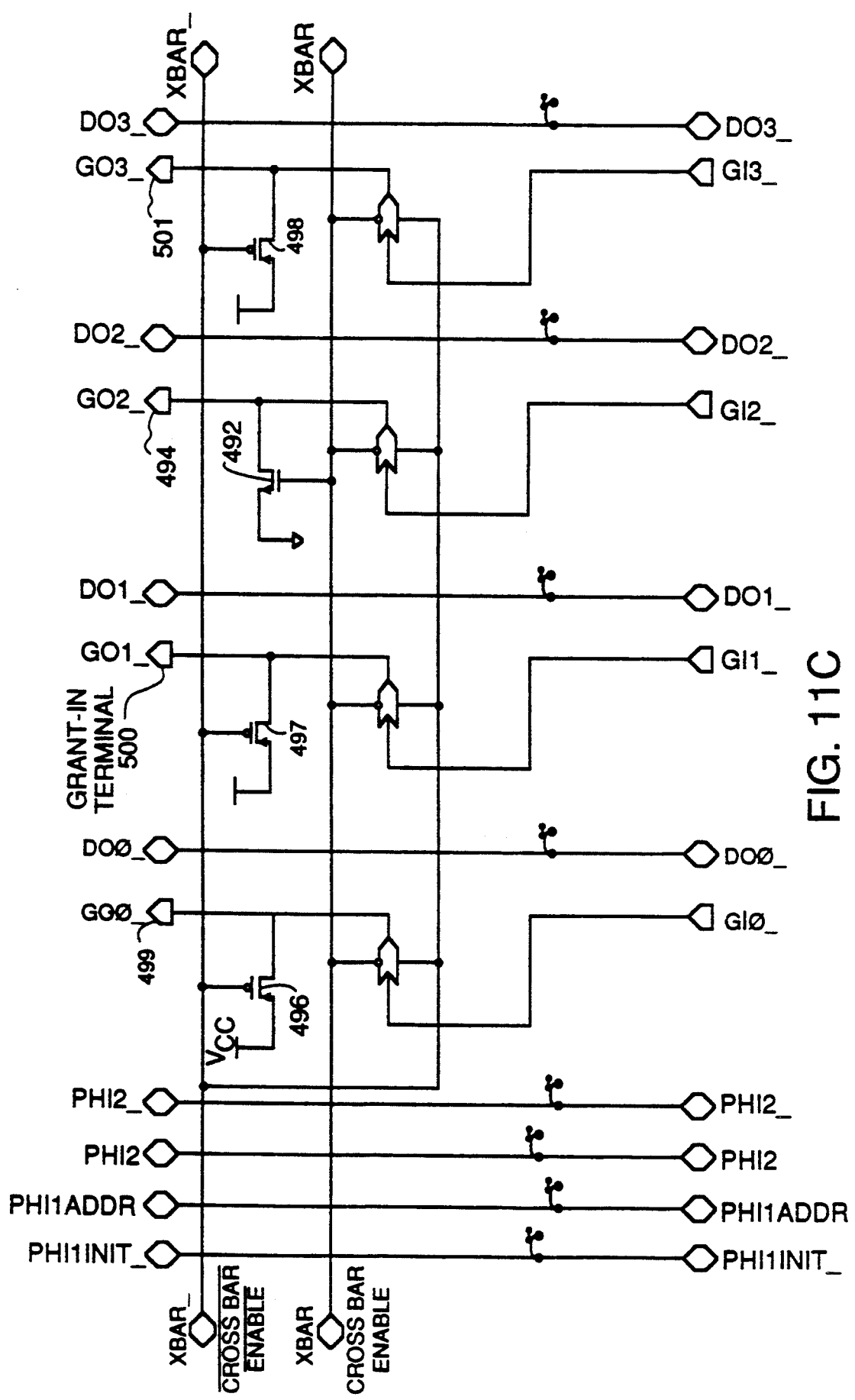

The switch array of FIG. 11c coupled between sections B and C in FIG. 10 is constructed so that N channel transistor 492 is associated with grant-in terminal 494 in section C. As seen from FIG. 10, this will cause grant circuits in section C associated with output wire C to be enabled in the crossbar personality mode. P channel transistors 496–498 are associated with grant-in terminals 499–501, respectively, shown in FIG. 10 so as to render the grant circuits associated with output wires A, B, and D disabled in the crossbar personality mode.

Figure 11D:
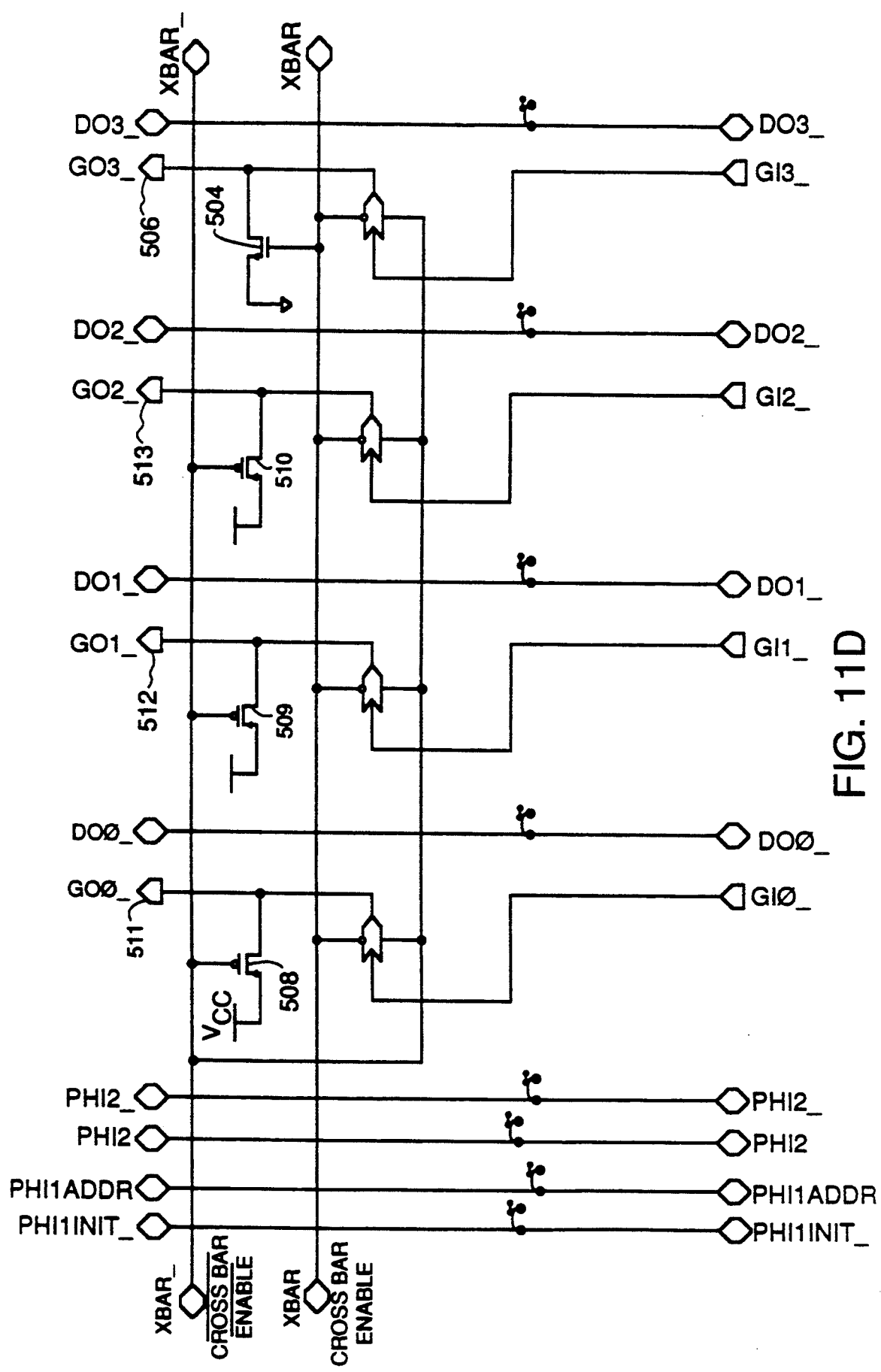

The switch array of FIG. 11d coupled between sections C and D in FIG. 10 is constructed so that N channel transistor 504 is associated with grant-in terminal 506 in section D. As seen from FIG. 10, this will cause grant circuits in section D associated with output wire D to be enabled in the crossbar personality mode. P channel transistors 508–510 are associated with grant-in terminals 511–513, respectively, shown in FIG. 10 so as to render the grant circuits associated with output wires A, B, and C disabled in the crossbar personality mode.

By using the configuration of the crossbar router chip shown in FIG. 10, the entire chip is utilized and, consequently, only 16 crossbar router chips are necessary in the third stage to provide connections to 1024 output terminals.

Not shown in FIG. 10 for simplicity are the various bus transceivers, pipeline latches, input-disable latches, and drivers previously discussed with reference to FIGS. 5 and 6.

Description of Operation After Connection is Made

After twelve routing address bits and three protocol bits have been retired by the three stage routing network, a PE cluster coupled to an input of a first stage router chip is connected to a PE cluster coupled to an output terminal of a third stage router chip.

Referring to FIG. 7, bits 19 to 22 are then used to address one of the 16 processor elements within the accessed PE cluster using a simple four bit decode means within each PE cluster. A protocol bit PB is then sent.

At this time a connection is made between a sending processor element and a receiving processor element, and the connection is frozen by control signals generated by the array control unit (not shown). The message bits are now transmitted through the routing network. A parity bit PY followed by an 0 bit (to test for stuck-at-1 wires) is first sent for testing the accuracy of the succeeding transmitted message and the quality of the connection.

After the full message is sent, the addressed processor element is controlled to send an acknowledgment ACK signal, consisting of a 0 bit followed by a 1 bit, back through the routing network to signal the originating processor element that the message has been received. In order to transmit this ACK signal back through the routing network, each stage must enable the appropriate tristate buffers in all the bus transceivers (two such buffers shown in FIG. 6 are buffers 314 and 226), and clock signals must be applied to the CLK2 inputs of the various pipeline latches (one such pipeline latch is shown in FIG. 6 as pipeline latch 224), in order to pass the ACK signal through the pipeline latches. At the same time, all buffers used to transmit the routing bits and message bits (e.g., buffers 240 and 326) are disabled.

The routing network arrangement described herein enables two of the routing address bits for the third stage to be redundant with two of the routing address bits retired by the first stage. This is made possible by the third stage crossbar router chips being divided up into four 16×16 crossbar switches and the outputs of the second stage chips being applied to one of 16×16 crossbar switches instead of being applied to any of 64 inputs of a routing chip.

Circuitry Used in Router Chips for Diagnostic Testing

Figure 12:
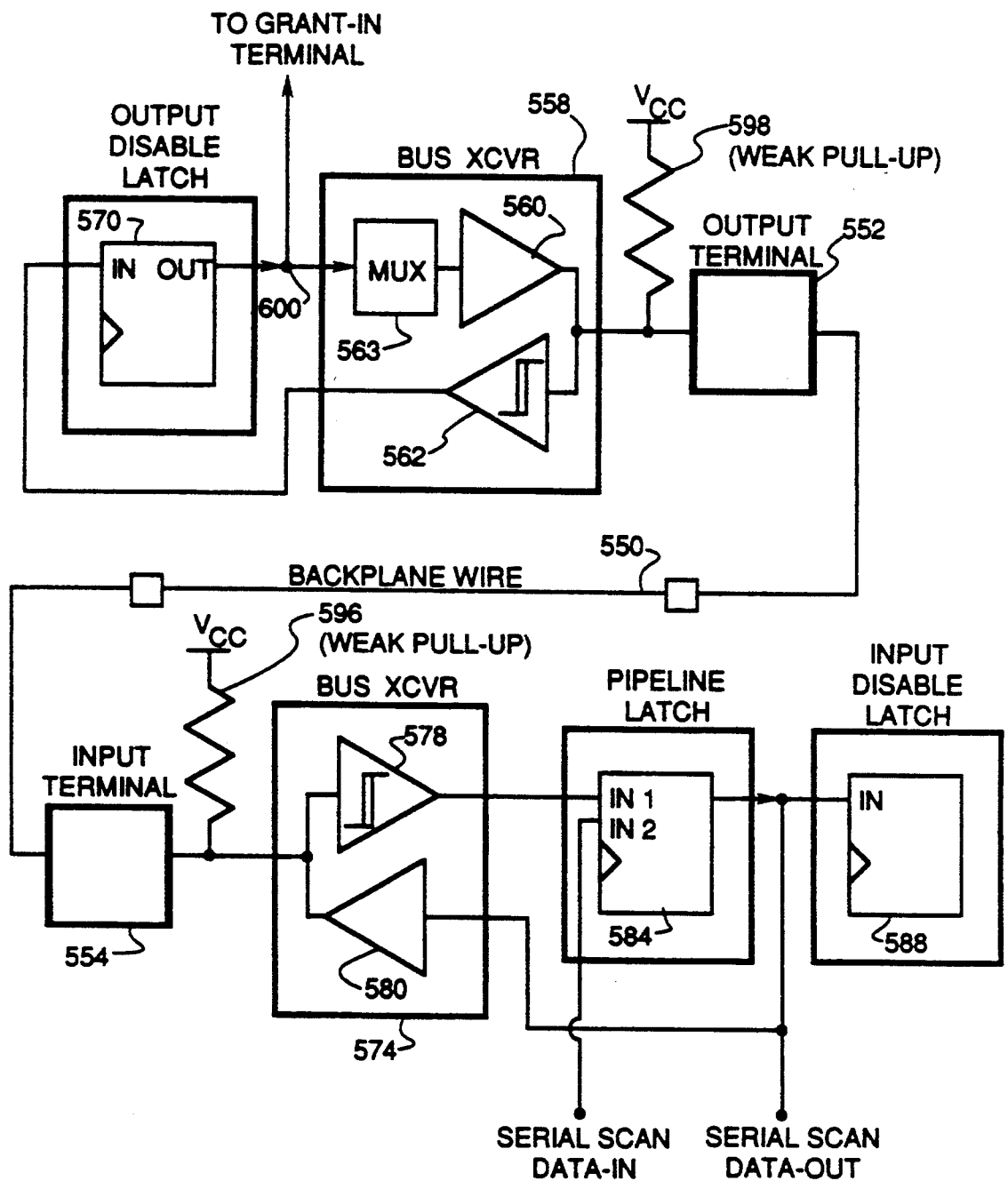
FIG. 12 shows the internal circuitry associated with the diagnostic testing of the router chip in accordance with the preferred embodiment of the invention.
Figure 13A:
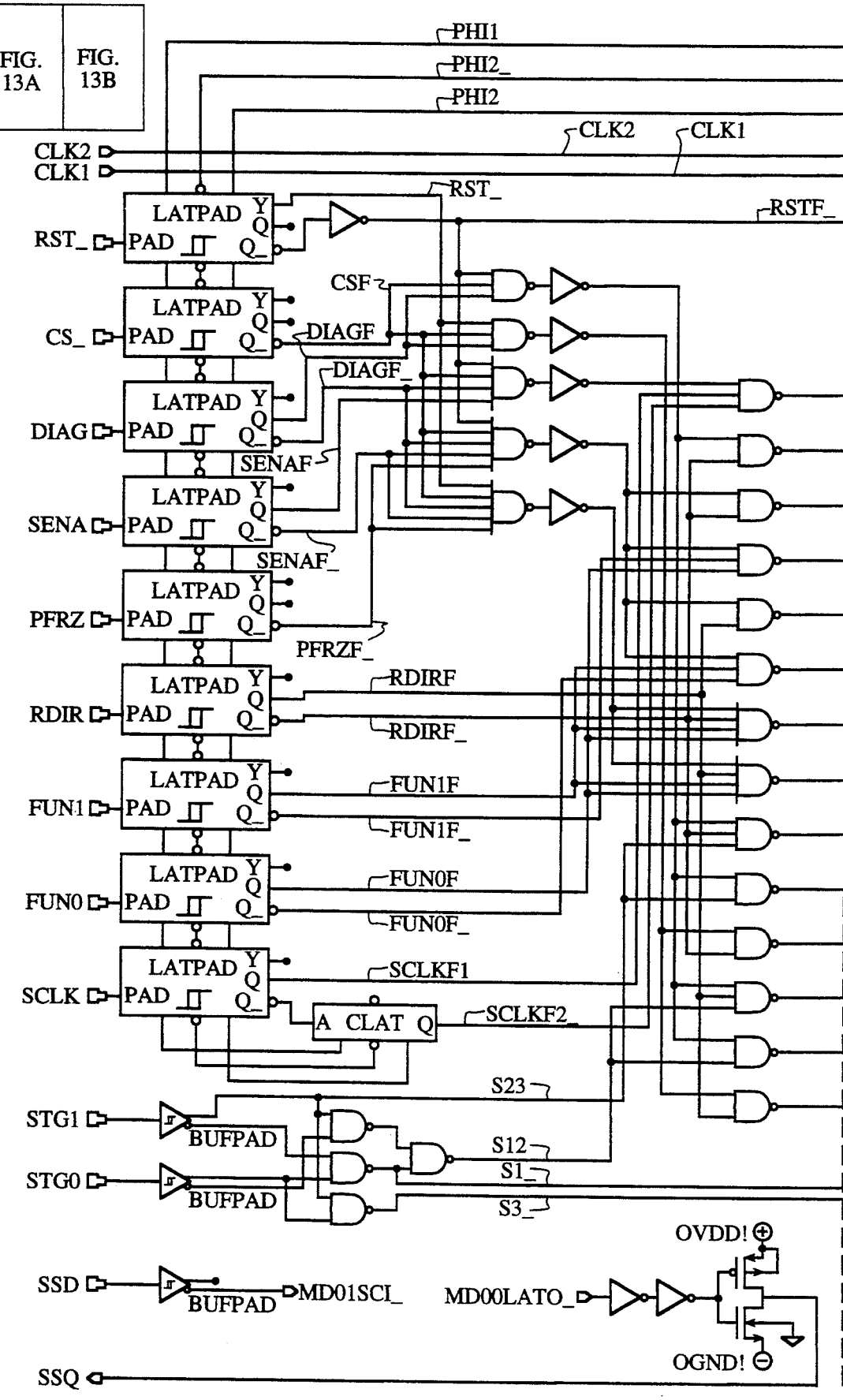
FIGS. 13a and 13b, taken together, show circuitry within the router chip for generating the various control signals used to control the operation of the router chip.
Figure 13B:
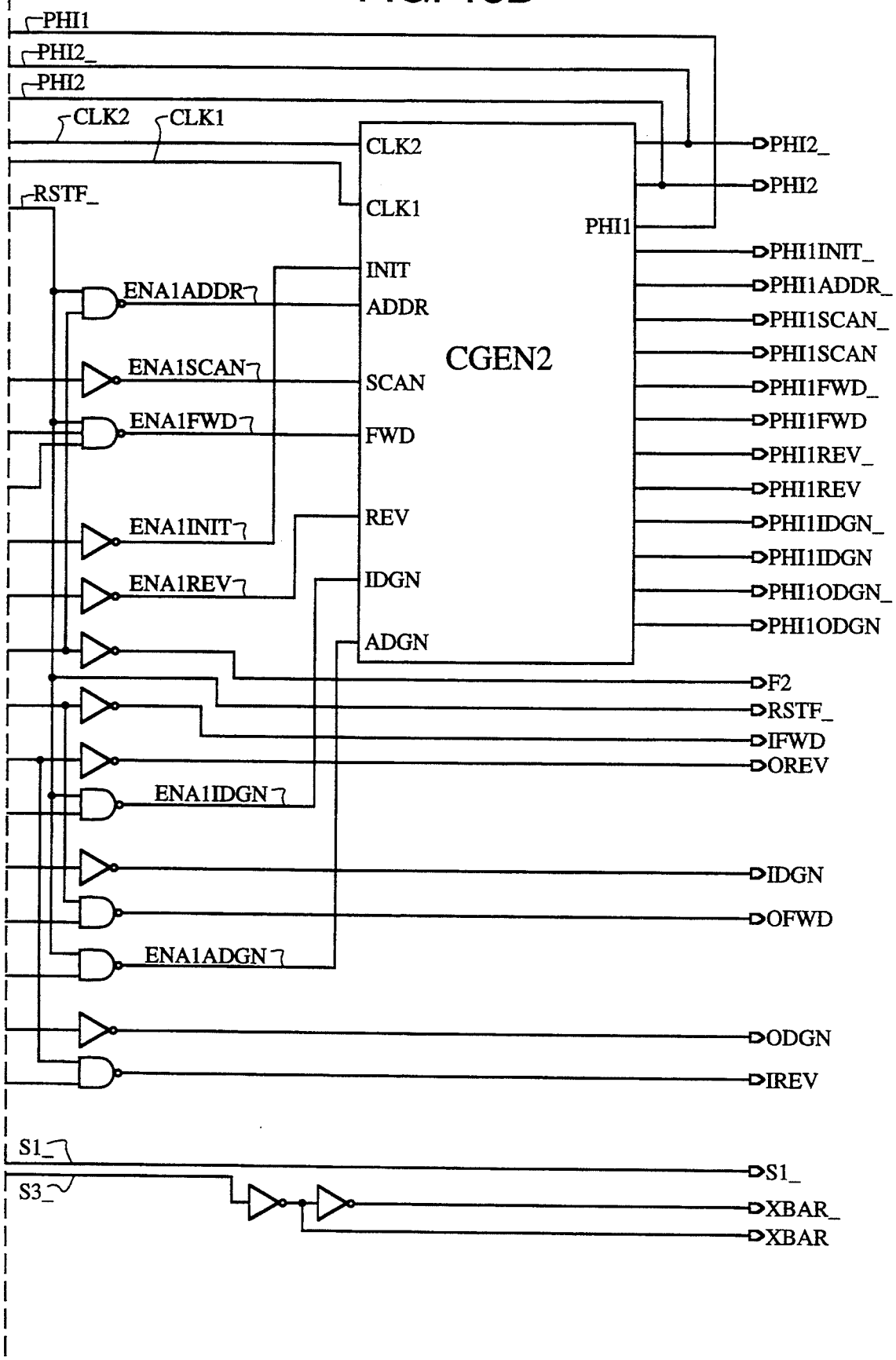
Figure 13C:
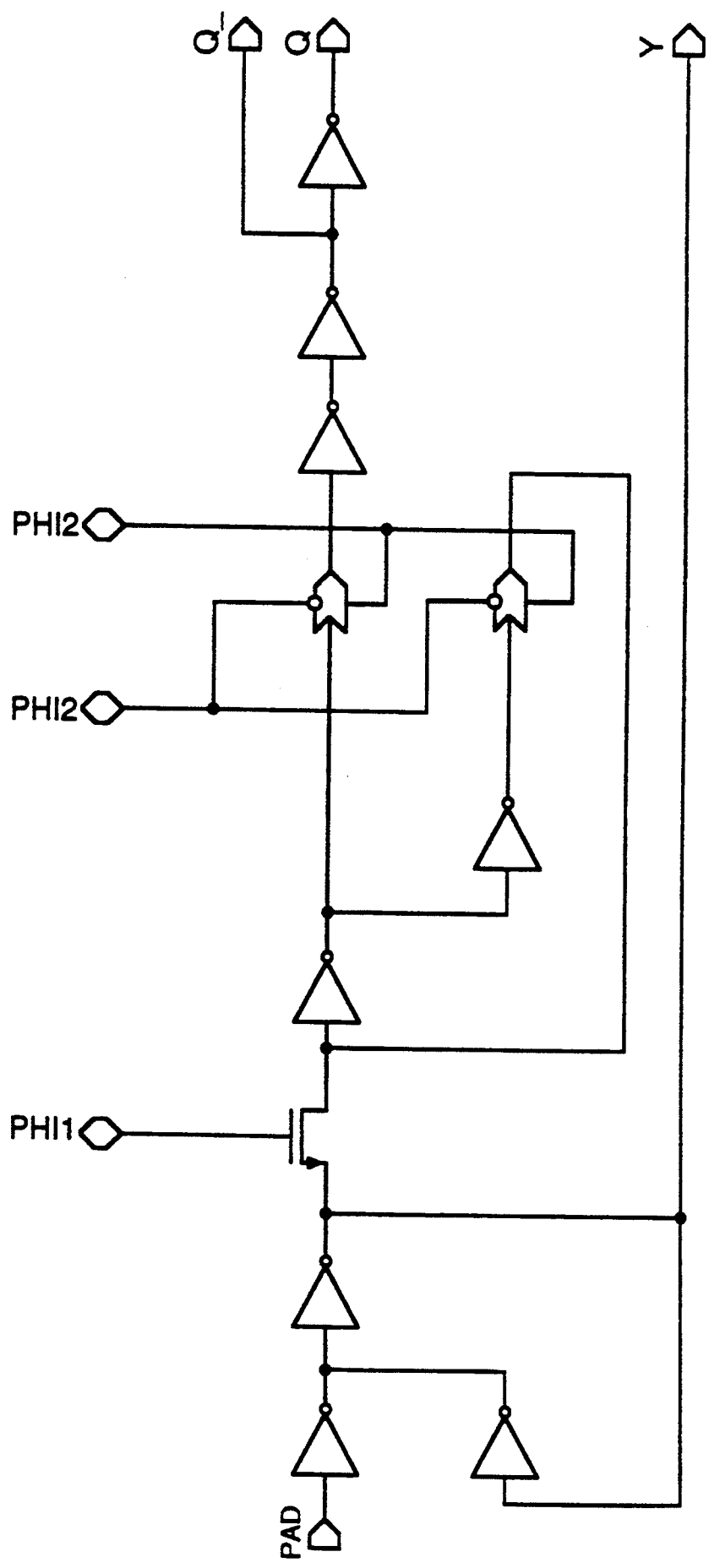
Figure 13D:
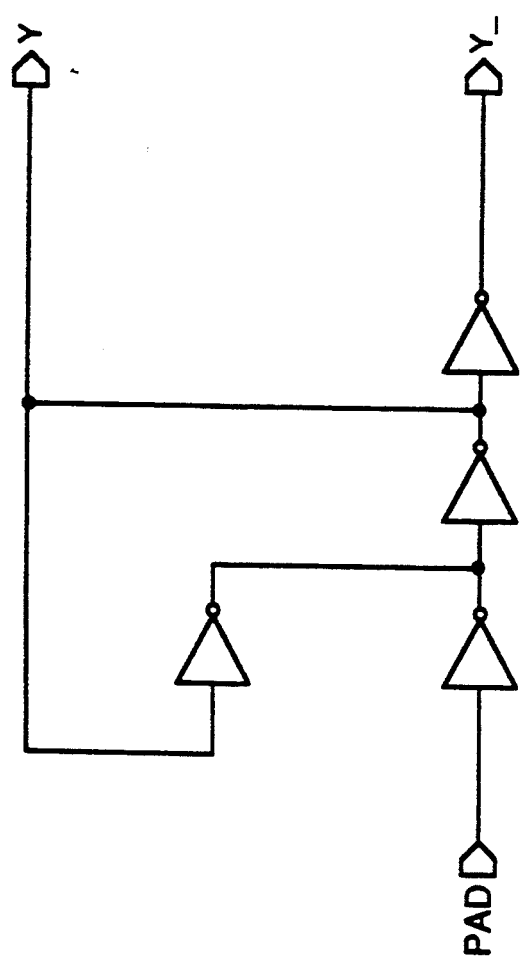
Figure 13E:
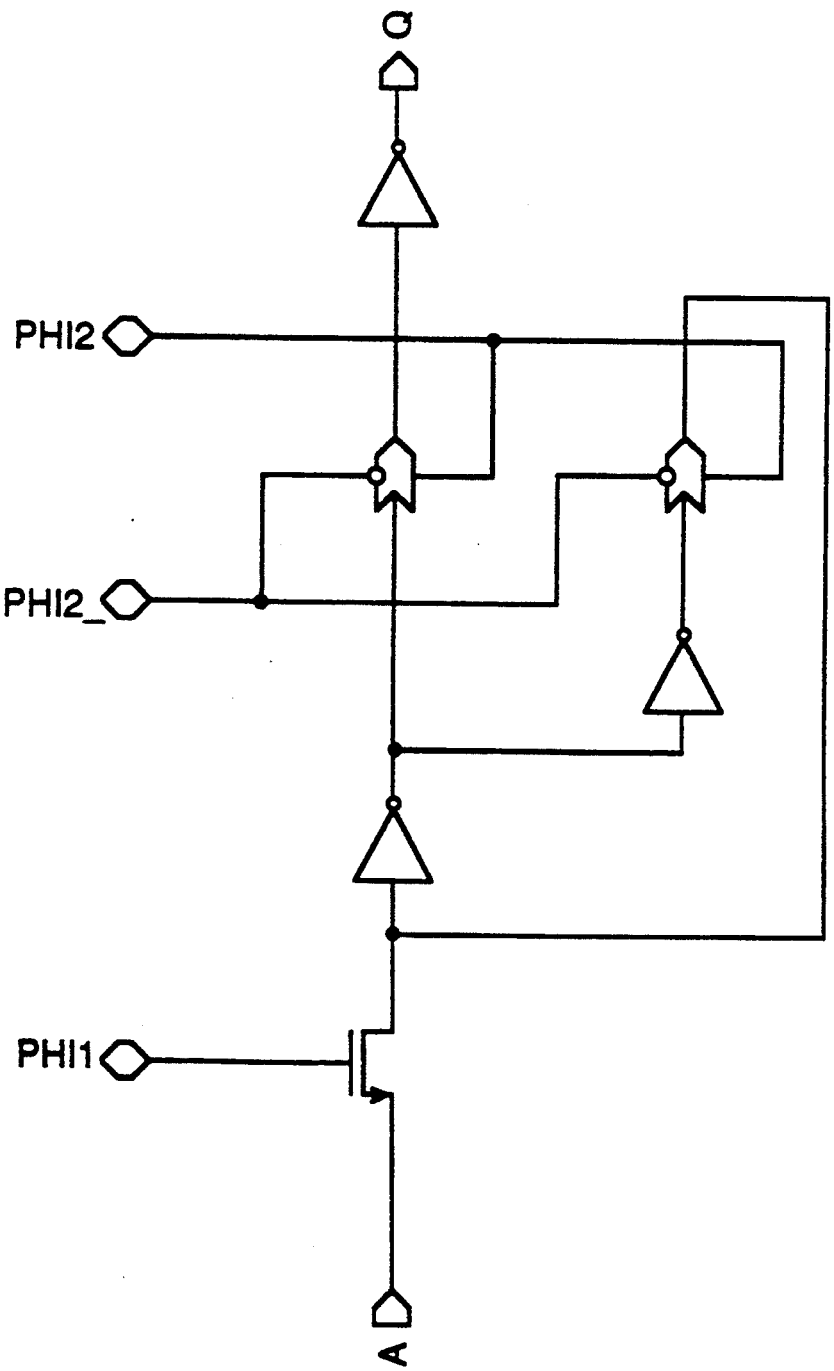
Figure 13F:
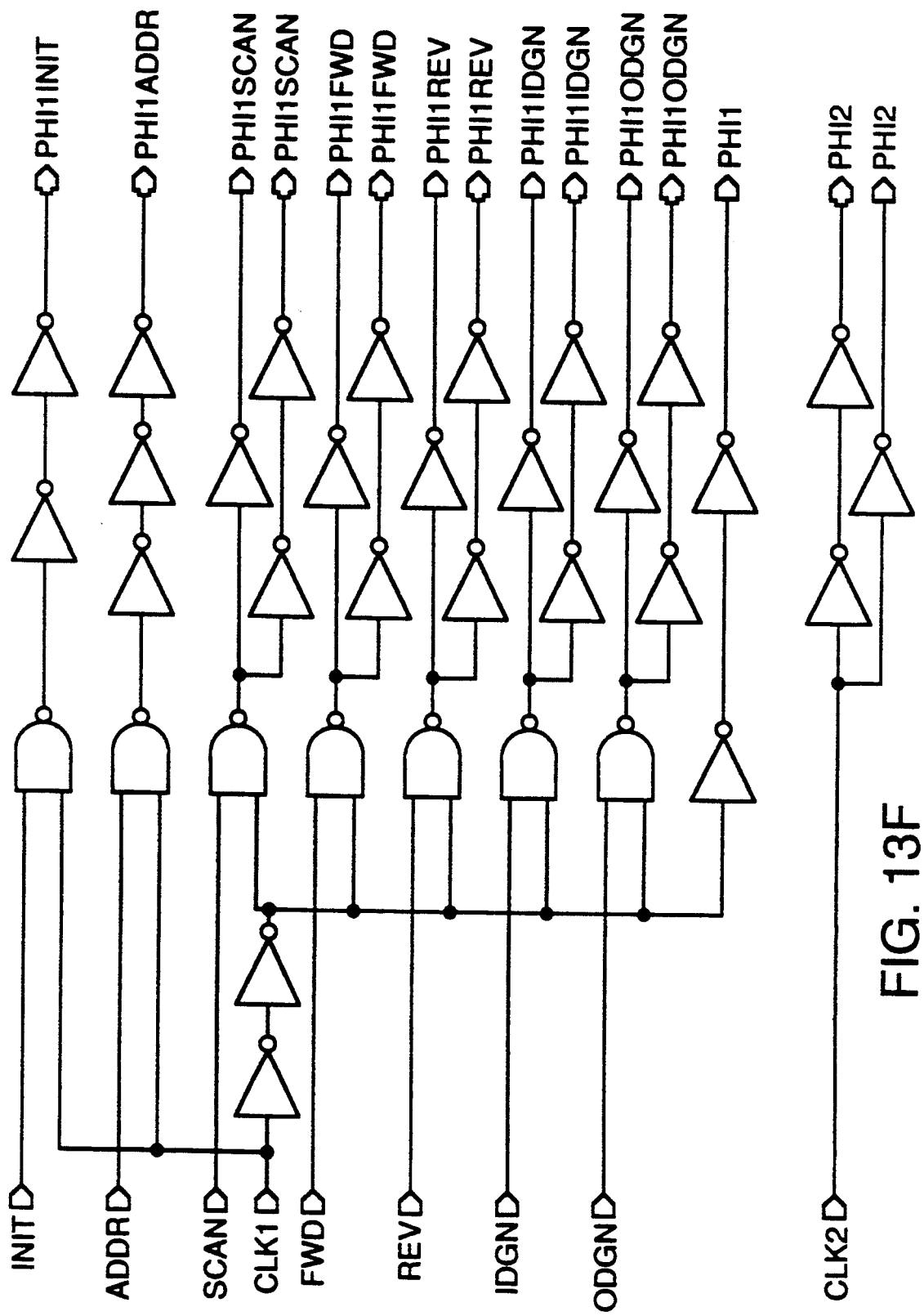
FIG. 13f shows more detail of the router chip clock generator (cgen2), shown in block form in FIG. 13b.
Figure 14:
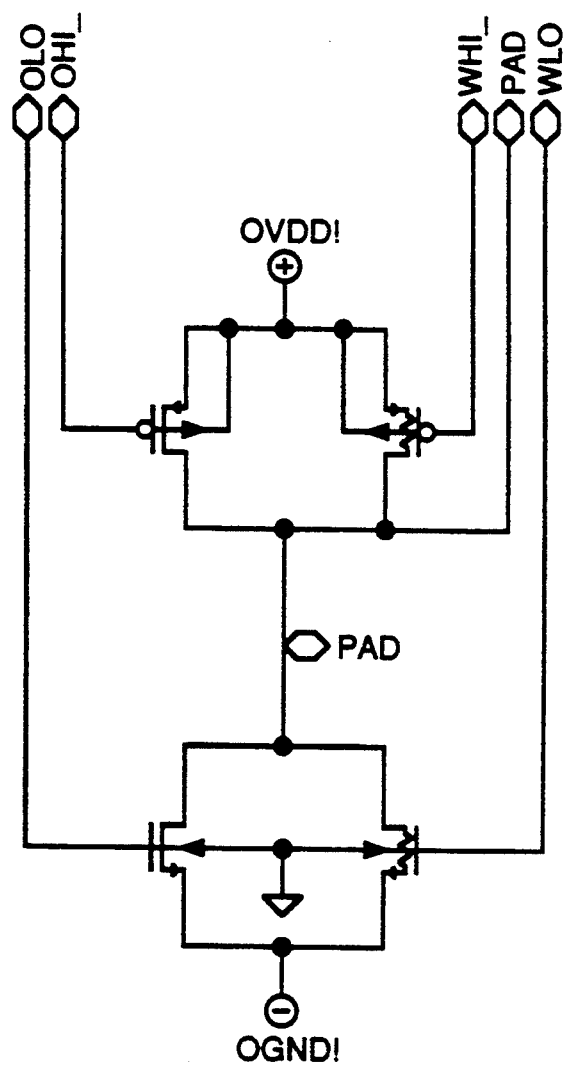
Figure 15:
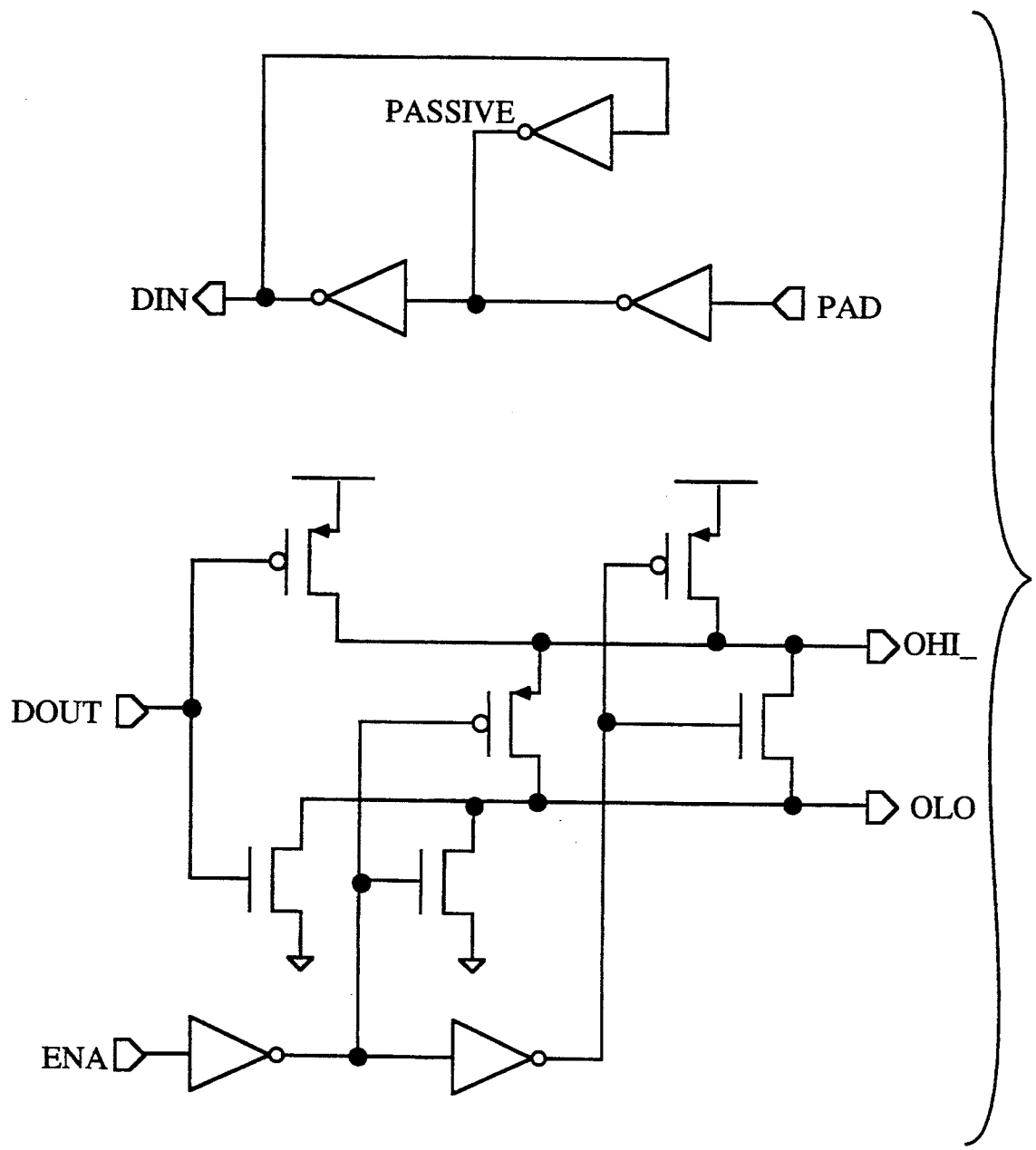

Shown in FIG. 12 is the router chip broken wire diagnostic circuit which is used between the first and second stages and between the second and third stages of the router network. Shown in FIG. 12 is backplane inter-board wire 550, which connects an output terminal 552 from a router chip of a previous stage to an input terminal 554 of a next stage. Between each of the stages there are 1,024 backplane inter-board wires 550. Connected to output terminal 552 is bus transceiver 558, comprising tristate CMOS buffer 560 (shown as buffer 326 in FIG. 6), hysteresis circuit 562 (hysteresis circuit 322 in FIG. 6), multiplexer 563 (multiplexer 310 in FIG. 6), and other circuitry described with respect to bus transceiver 300 shown in FIG. 6. An output disable latch 570 is connected so as to receive an output signal from hysteresis circuit 562 and output a latch signal through multiplexer 563 to an input terminal of tristate buffer 560. An output of disable latch 570 is coupled to a grant-in terminal of an associated grant circuit.

As discussed with respect to FIG. 6, input terminal 554 of a router chip is connected to various buffers, designated in FIG. 12 as bus transceiver 574 comprising tristate buffer 580 (shown as buffer 226 in FIG. 6) and hysteresis circuit 578 (hysteresis circuit 221 in FIG. 6) for simplicity. The output of hysteresis circuit 578 is connected to the one input of pipeline latch 584, and the output of pipeline latch 584 is connected to the input of input disable latch 588. Also connected to the input of disable latch 588 is the input of tristate buffer 580. Pull-up resistors 596 and 598, connecting the input and output terminals 554 and 552, respectively, to the supply voltage $V_{cc}$, serve to pull the input and output terminals to a high state when these terminals are not being driven to a low state. These pull-up resistors 596 and 598 are actually transistors forming part of the weak latch circuits 227 and 318 discussed with respect to FIG. 6.

The operation of the diagnostic circuit of FIG. 12 is as follows. The diagnostic routine to detect broken wires in the backplane inter-board bus is implemented each time the parallel processing system containing the router network is turned on. Prior to the diagnostic program being implemented, pipeline latch 584 for each of the input terminals on the router chips comprising the second and third stages is loaded with a logical 0 by a serial scan input applied to a second input terminal of pipeline latch 584 and clocked in with a separate clock signal. During the first diagnose phase, voltage $V_{cc}$ is applied to the pull-up resistors 596 and 598, and tristate buffer 560 is disabled, while tristate buffer 580 is enabled. (Hysteresis circuits 562 and 578 are always active.) Thus, in this configuration, the low output of pipeline latch 584 is transmitted via tristate buffer 580 over backplane wire 550 and through hysteresis circuit 562 and sets output disable latch 570 to have a logical 0 output on line 600.

During the second diagnose phase, $V_{cc}$ remains applied to pull-up resistors 596 and 598, and tristate buffer 580 is disabled, while tristate buffer 560 is enabled. Thus, in this phase, the logical 0 output of output disable latch 570 is transmitted back through backplane wire 550 to load a logical 0 into pipeline latch 584. On the next clock pulse, this logical 0 is loaded into input disable latch 588 (since pipeline latch 584 delays propagation between its input and its output by one clock pulse). Thus, a logical 0 state of input disable latch 588 indicates that the backplane wire 550 coupled between terminals 552 and 554 is functional.

As seen with respect to FIG. 6, a logical 1 signal outputted by an input disable latch (such as input disable latch 230 in FIG. 6) prevents any router address bits from entering channel address decoder 202.

If backplane wire 550 was broken, then in the second diagnose phase, output disable latch 570 would not have pulled input terminal 554 down to a low state, since there would be no coupling between output disable latch 570 and input terminal 554. In this case, pull-up resistor 596 would have driven input terminal 554 high and loaded a logical 1 into pipeline latch 584 and into input disable latch 588, thus indicating that backplane wire 550 is an open circuit. Further, if the output of hysteresis circuit 562 was not pulled down to a logical 0 during the first diagnostic phase, output disable latch 570 would have been loaded with a logical 1, since pull-up resistor 598 would pull up output terminal 552 if terminal 552 was not driven low. As shown in FIGS. 6 and 10, this logical 1 (i.e., $\overline{\text{grant-in}}=1$) output of output disable latch 570 is coupled to the grant-in terminal of a bottom grant circuit associated with that output terminal. This logical 1 $\overline{\text{grant-in}}$ signal applied to the grant-in terminals, as described with respect to Table I, disables all grant circuits in that router chip associated with the faulty wire so as to prevent any connection to that faulty wire.

Following the various diagnose phases, the contents of the pipeline latches 584 associated with each input terminal of the router chips in the second and third stages are serially scanned using the same circuitry which initially loaded the pipeline latches 584 with a logical 0. This scan identifies the existence of a broken wire between the input and output terminals of adjacent stages so that corrective maintenance can be conducted. Note that there is no way to disable (and thereby bypass) an output shorted to ground since a grounded backplane wire 550 would also result in a final pipeline latch state of a logical 0.

Actual Circuitry Used to Implement Above-Described Router Chip

FIGS. 13–25 illustrate the actual circuitry used in the preferred embodiment router chip. One of ordinary skill in the art upon reviewing the circuitry of FIGS. 13–25 would understand the interconnections of the circuitry and the control signals necessary to operate the circuitry. The operation and equivalent circuitry of the various circuits shown in FIGS. 14-25 have been previously discussed with respect to FIGS. 3-12, and further discussion of the detailed operation of the various circuits and components shown in FIGS. 14-25 would be largely redundant and unnecessarily detailed.

FIGS. 13a-13f show the control circuitry within the router chip used to generate the clocking and control signals for operating the various latches and switches shown in the figures.

Some explanation of the clocking of the circuitry in the router chip and of the pipeline latch 650 shown in FIG. 16 is appropriate.

Figure 17:
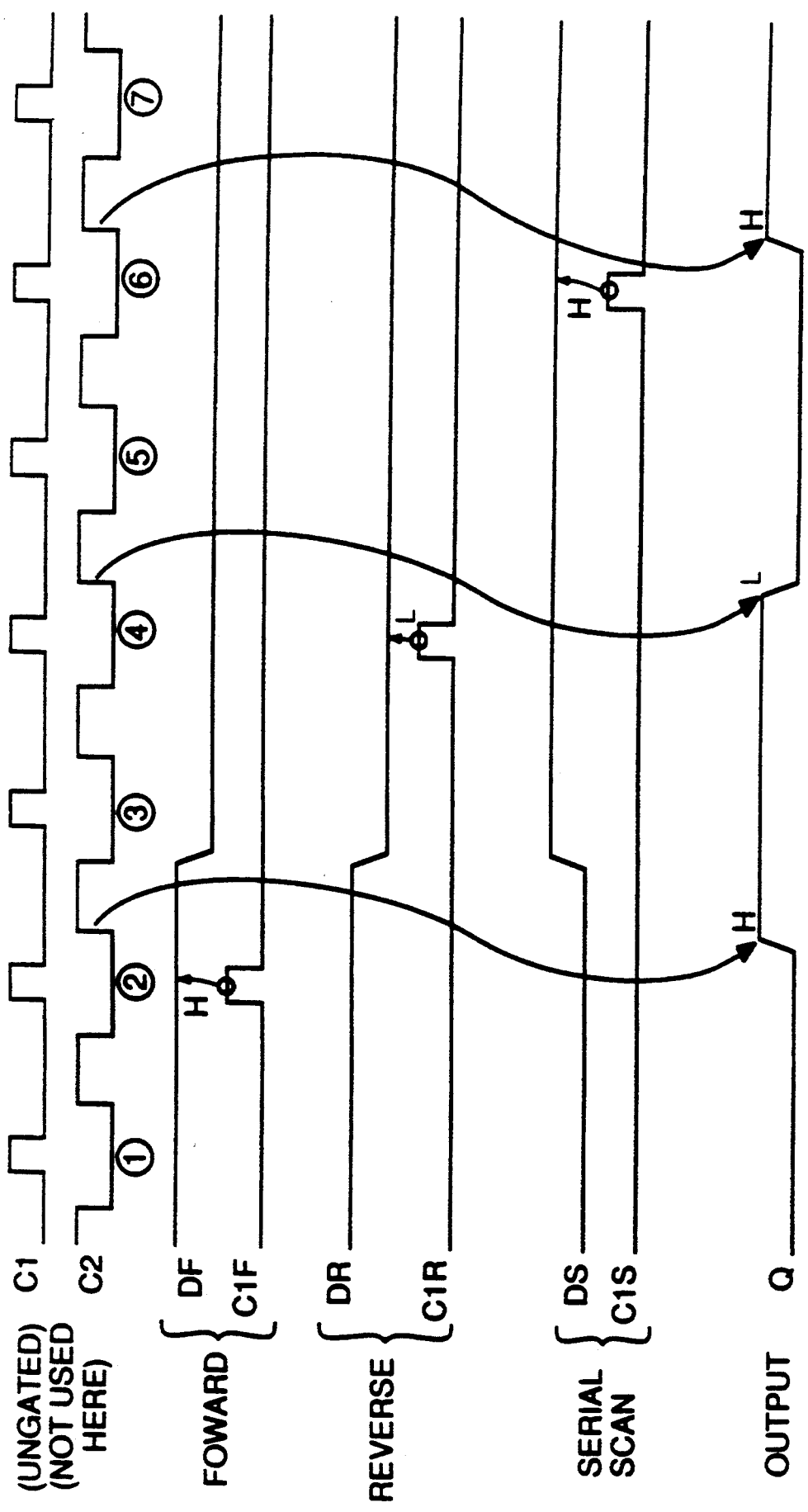
Figure 18:
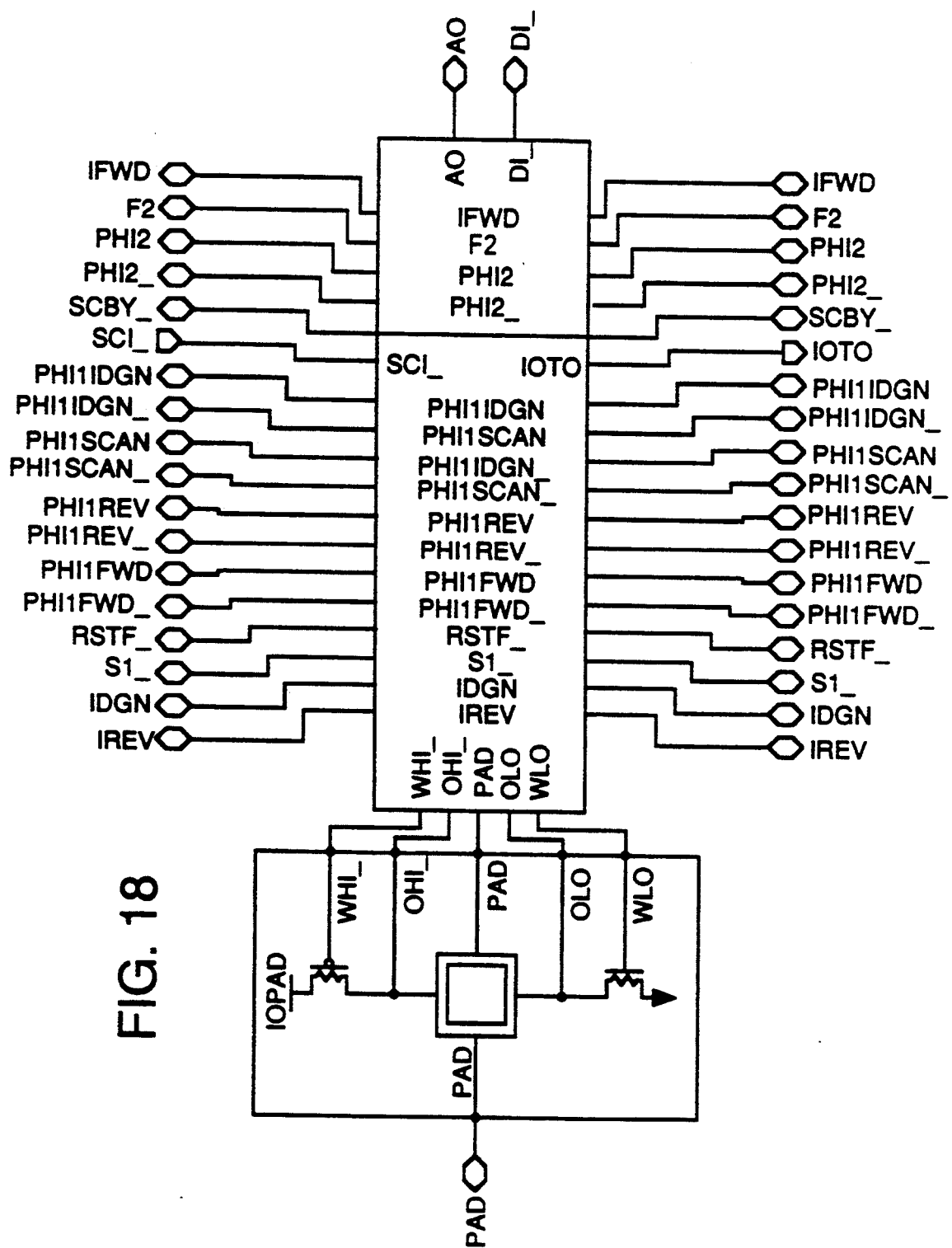
Figure 19:
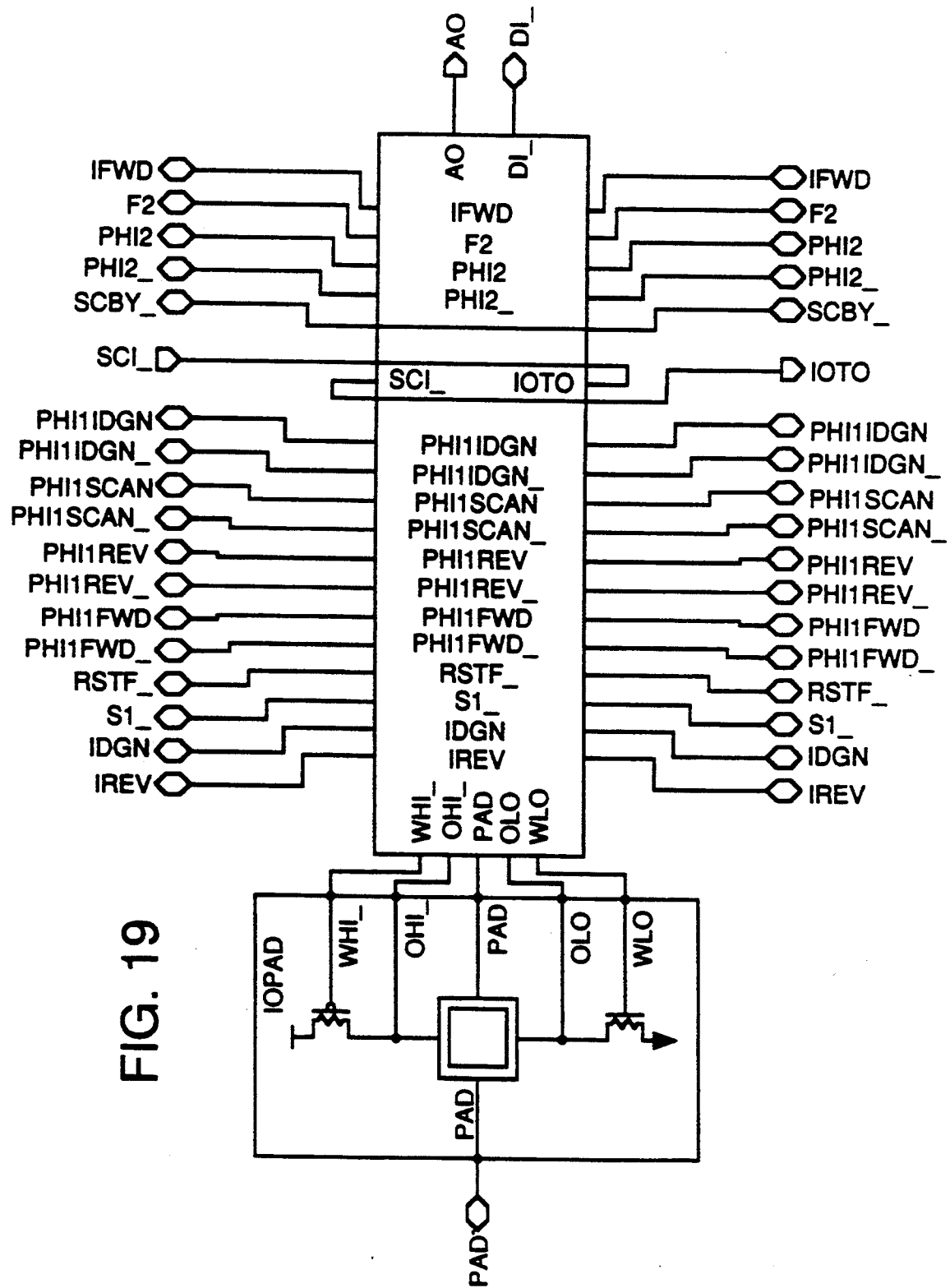
Figure 20:
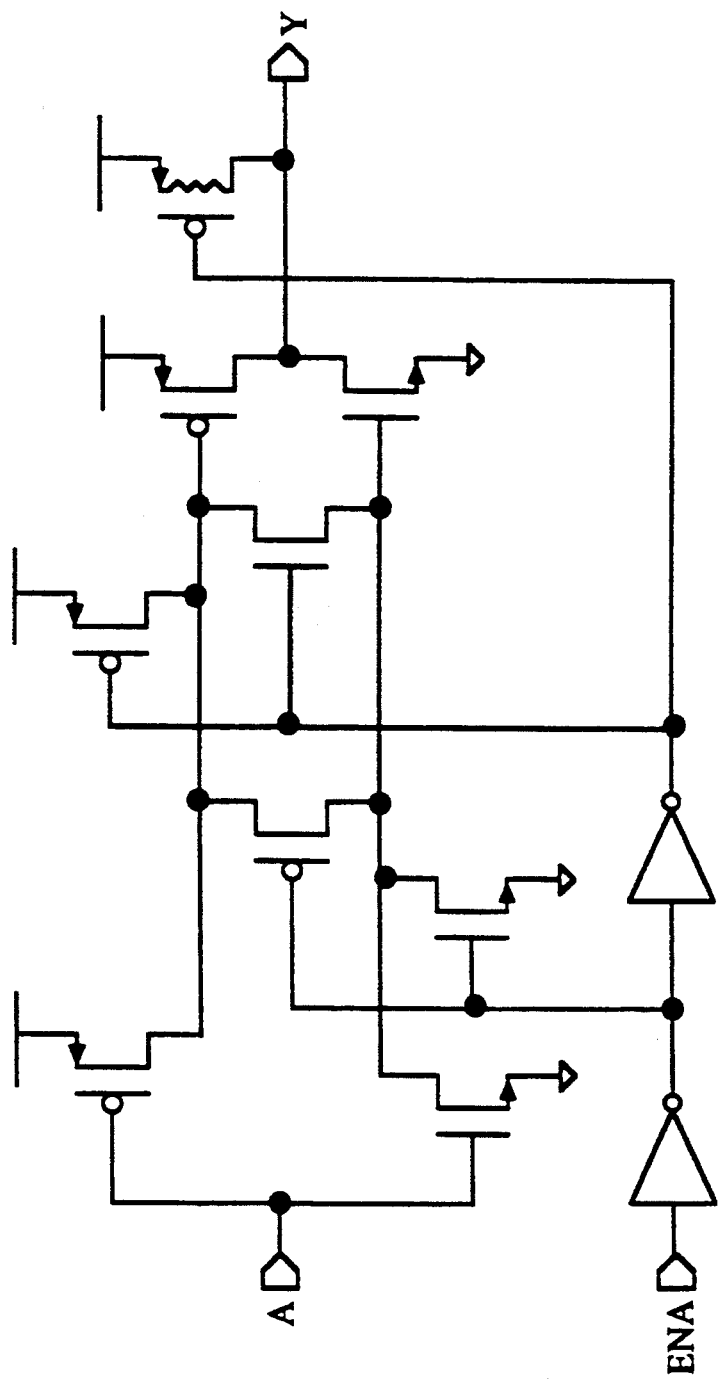
Figure 21:
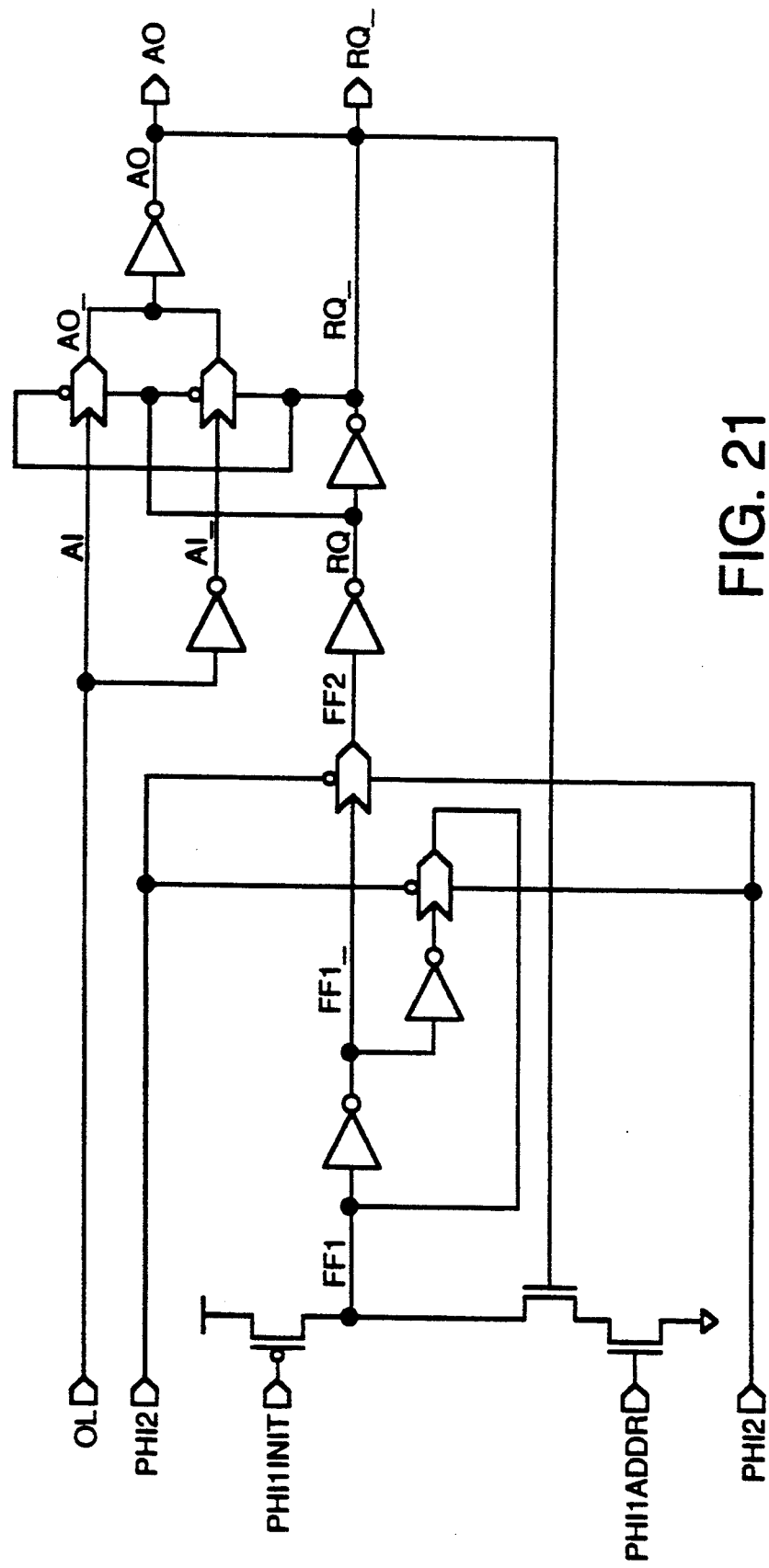
Figure 22:
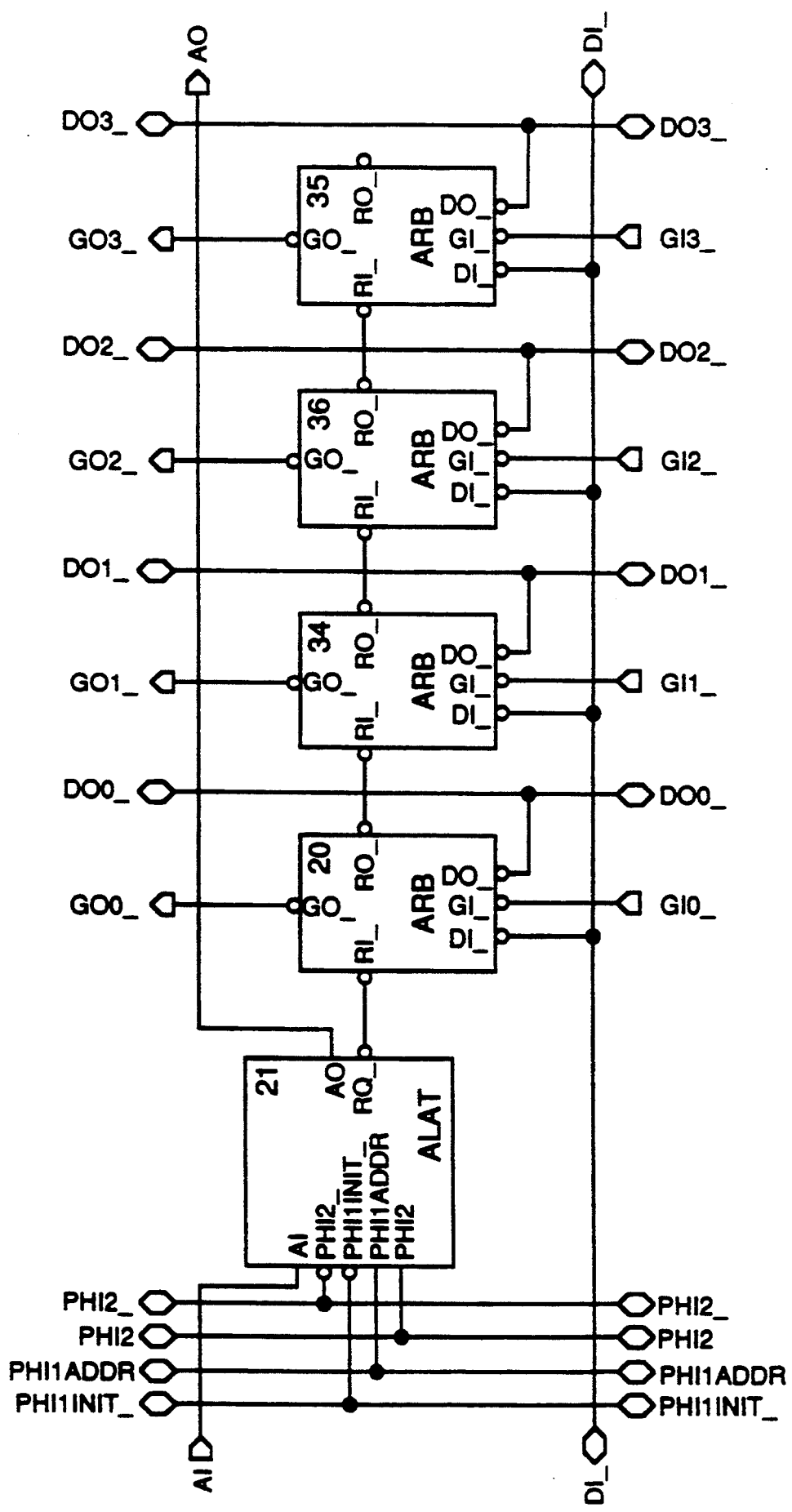
Figure 23:
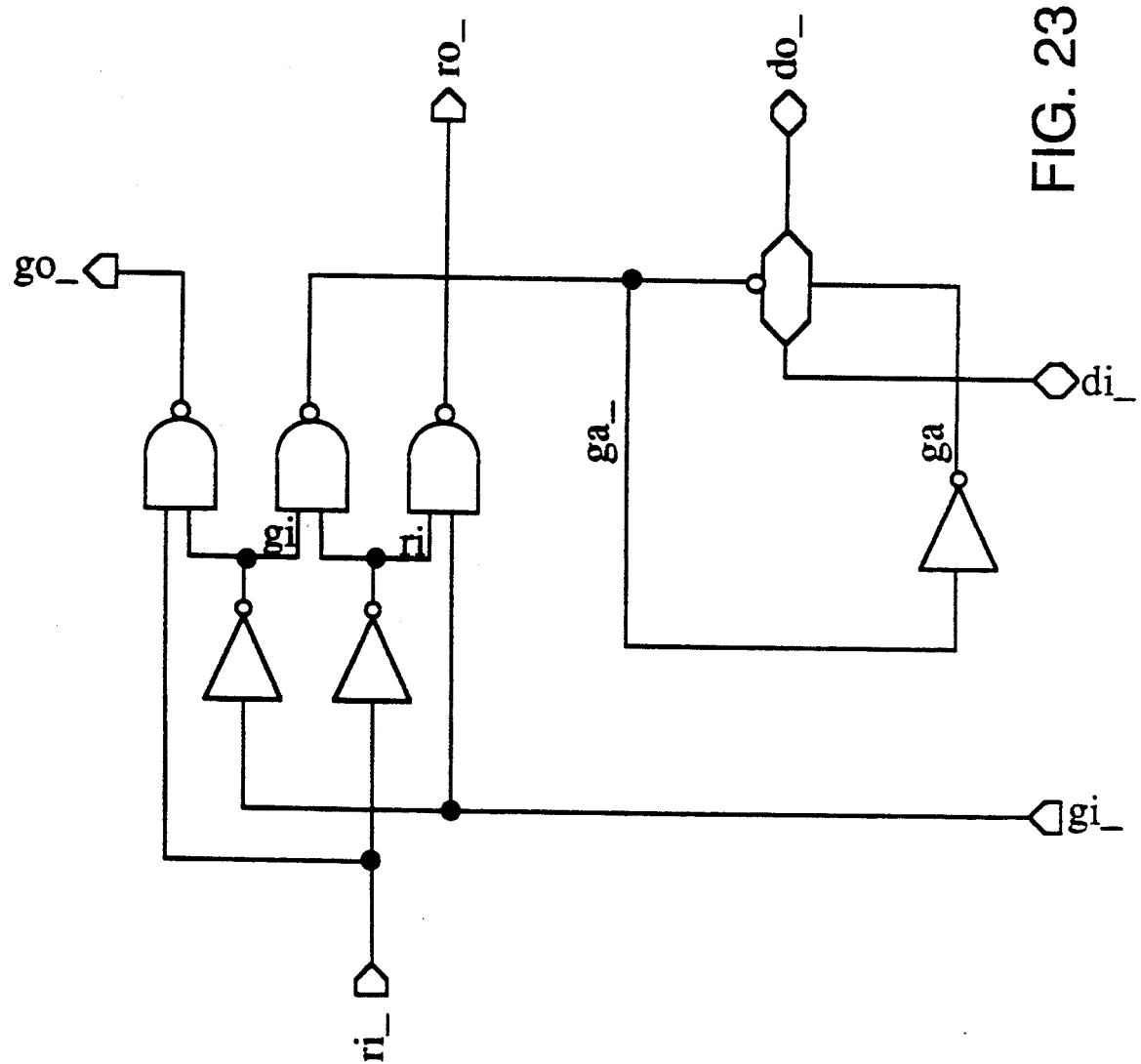

The router chip uses two-phase non-overlapping clocks C1 (phase 1) and C2 (phase 2), shown in FIG. 17. C1 uses short pulses and is used to sample data at the inputs of latches. C2 uses longer pulses and is used to clock all the various latch outputs at the same time. The changing latch outputs propagate through combinatorial logic through the chip in accordance with C2. Clock C1 always runs but is gated for the various latches to cause the various latches to sample input data only in designated cycles.

In many of the circuits (e.g., FIGS. 16, 21, 22, 24-26), complementary clock signals are used. This is preferred because of the CMOS implementation. Only the positive clock signals are shown in the timing diagram of FIG. 17 however.

In the timing diagram of FIG. 17, C1 is shown as a free-running clock. In a cycle during which a gated C1 clock is enabled, the enabled C1 clock looks like a copy of C1 for that cycle.

With respect to the operation of the pipeline latch 650 circuitry shown in FIG. 16, forward-message data is presented to the transparent latch on line DF and is clocked into the latch by line C1F (and, in this CMOS implementation, C1F-bar). Similarly, reverse-message data on line DR is clocked by line C1R, and serial-scan data on line DS is clocked by line C1S.

In any cycle, only one of C1F, C1R, and C1S may be active, or all three may be inactive. This is controlled by circuitry on the chip which is in turn controlled by the external array control unit. During a cycle in which one of C1F, C1R, and C1S is active, if the data sampled (clocked) into the latch is of a polarity opposite to the latch's output, then the output will change on the next rising edge of C2. If none of C1F, C1R, and C1S is active, then the latch's output will not change in that cycle.

Figure 24:
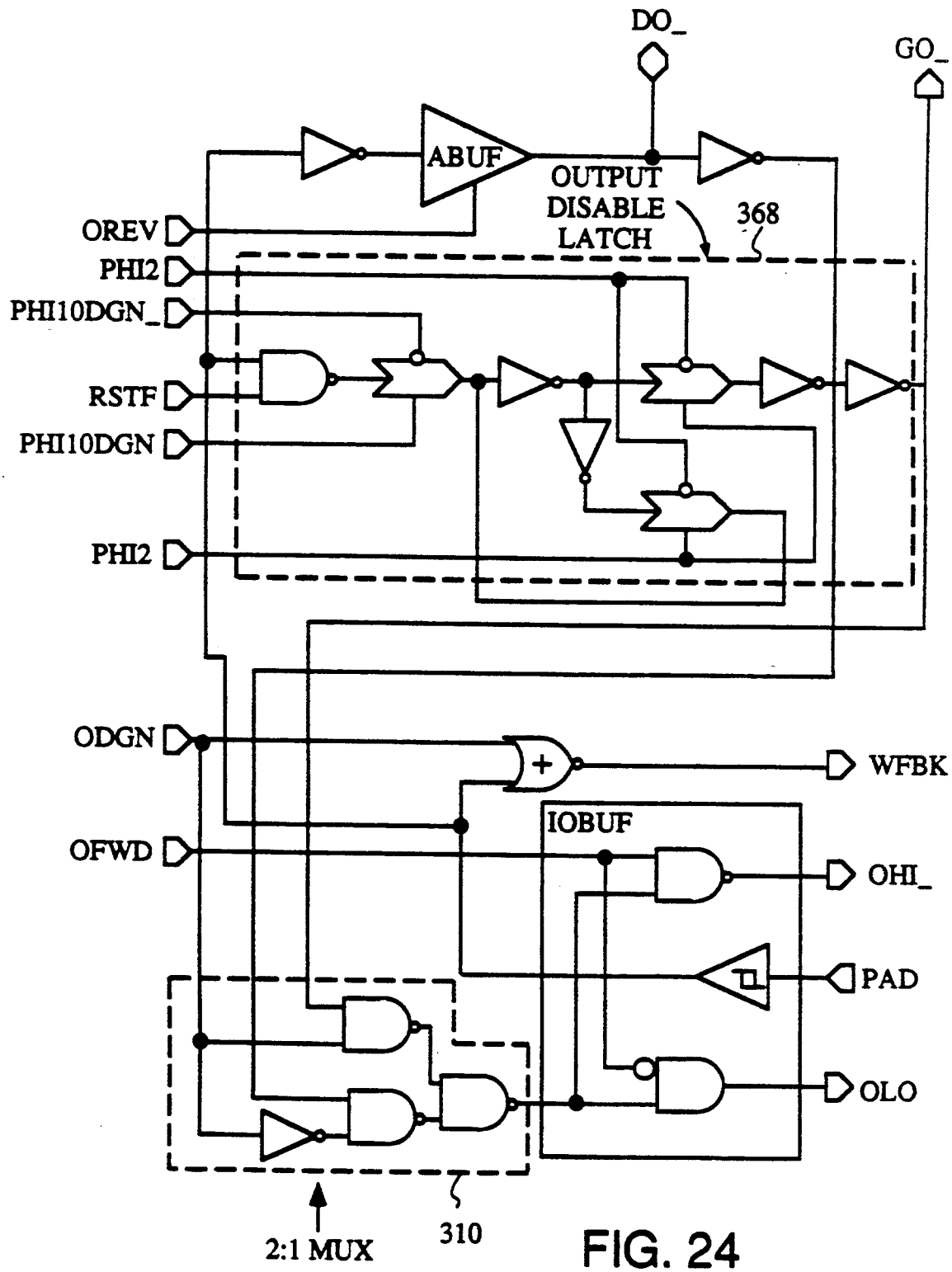

FIG. 24 shows the circuitry for the output disable latch 368 and the 2:1 multiplexer 310 shown in block diagram form in FIG. 6.

Summary and Conclusion

A novel router chip has been described which possesses numerous advantages over prior art router chips.

The specific embodiments herein described are only illustrative of the invention. Other embodiments using the above-described concepts are also intended to be encompassed by the invention. Various other changes in structure may additionally occur to those skilled in the art, and all of these changes are to be understood as forming a part of the invention insofar as they fall within the true spirit and scope of the following claims.

What is claimed is:

1. A router circuit having a plurality of router circuit input terminals and a plurality of router circuit output terminals, said router circuit having the ability to either connect one of said plurality of router circuit input terminals to one of a plurality of output channels in a hyperbar mode, where each output channel includes a group of said router circuit output terminals, or connect one of said plurality of router circuit input terminals to a specific one of said router circuit output terminals in a crossbar mode, said router circuit comprising:

a plurality of sections, each section being coupled to a different group of said router circuit input terminals, each section comprising a plurality of routing address bit decoders and a plurality of connecting means, each of said routing address bit decoders and each of said connecting means being coupled to respective ones of said router circuit input terminals coupled to that section, each of said routing address bit decoders being coupled to said respective ones of said router circuit input terminals for decoding routing address bits applied to said router circuit input terminals and outputting at a control output terminal enabling-/disabling control signals for controlling an associated one of said connecting means to connect a respective one of said router circuit input terminals to one of said router circuit output terminals, each of said connecting means in said router circuit comprising a plurality of grant circuits for connecting a data input line, a data input line being coupled to each of said router circuit input terminals, to one of said router circuit output terminals of said router circuit, a group of grant circuits being connected within each output channel, said grant circuits having grant request terminals coupled to said control output terminal of an associated one of said decoders, said grant circuits in said router circuit being arranged in rows and columns, each row being associated with one of said router circuit input terminals, each column being associated with a single router circuit output terminal, each of said sections having at least one end row which is adjacent to an end row in an adjacent section, each of said grant circuits having an enable/disable input terminal and an enable/disable output terminal, each of said grant circuits within a same section and in a same column having an enable/disable input terminal coupled to an enable/disable output terminal of a grant circuit in an adjacent row within said same section, except for grant circuits in said end row of a section adjacent to another section; and hyperbar mode/crossbar mode switching means connected between adjacent ones of said sections of said router circuit for coupling enable/disable input terminals of grant circuits in said end row of an associated section to either enable/disable output terminals of said end row of grant circuits in an adjacent section, for achieving a hyperbar mode, or to fixed logic levels, for achieving a crossbar mode, wherein in said hyperbar mode a single router circuit input terminal is connectable by said connecting means to any of said router circuit output terminals within an output channel designated by said routing address bits, and wherein in said crossbar mode a single router circuit input terminal is connectable by said connecting means to only a specific one of said router circuit output terminals within said output channel designated by said routing address bits.

2. The router circuit of claim 1 wherein said control output terminal of each of said decoders is directly coupled to a grant request terminal of a first grant circuit in an associated output channel, and said control output terminal of said decoders is coupled through logic means to grant request terminals of additional grant circuits connected to said first grant circuit in said associated output channel.

3. The router circuit of claim 1 wherein said fixed logic levels are of such levels as to enable only one column of grant circuits per output channel in each of said sections, each of said sections having different columns of grant circuits enabled in said crossbar mode of operation.

4. The router circuit of claim 1 wherein an enable/disable output terminal of a first grant circuit, connected to a certain router circuit output terminal, applies a first logic state signal to an enable/disable input terminal of a second grant circuit, also connected to said certain output terminal, if said first grant circuit is controlled by one of said routing address bit decoders to connect a router circuit input terminal to said certain output terminal, said first logic state signal acting to disable said second grant circuit.

5. The router circuit of claim 4 wherein said first grant circuit and said second grant circuit are within a single one of said sections.

6. The router circuit of claim 5 wherein said first grant circuit has its enable/disable input terminal coupled to said hyperbar mode/crossbar mode switching means so that when said hyperbar mode/crossbar mode switching means applies a fixed logic state signal of said first logic state to said enable/disable input terminal of said first grant circuit, said first grant circuit and said second grant circuit will be disabled.

7. The router circuit of claim 6 wherein when said hyperbar mode/crossbar mode switching means applies a fixed logic state signal of a second logic state to said enable/disable input terminal of said first grant circuit, said first grant circuit will be enabled.

8. The router circuit of claim 7 wherein said hyperbar mode/crossbar mode switching means applies fixed logic state signals to enable/disable input terminals of grant circuits associated with a single output channel in a section so as to enable only one column of grant circuits per output channel in each of said sections, each of said sections having different columns of grant circuits enabled.

9. The router circuit of claim 1 wherein said hyperbar mode/crossbar mode switching means is controlled by crossbar enable signals, and wherein said crossbar enable signals control said hyperbar mode/crossbar mode switching means so as to disable all except one column of grant circuits per output channel for each of said sections, each section having different columns of grant circuits not disabled by said hyperbar mode/crossbar mode switching means when said router circuit is switched to a crossbar mode.

10. The router circuit of claim 9 wherein each of said grant circuits in a single column are constructed so that signals outputted at said enable/disable output terminals of said grant circuits allow only one grant circuit in said single column to connect a router circuit input terminal to a single router circuit output terminal associated with said single column.

11. A router circuit having a plurality of router circuit input terminals and a plurality of router circuit output terminals, said router circuit having the ability to either connect one of said plurality of router circuit input terminals to one of a plurality of output channels in a hyperbar mode, where each output channel includes a group of said router circuit output terminals, or connect one of said plurality of router circuit input terminals to a specific one of said router circuit output terminals in a crossbar mode, said router circuit comprising:

a plurality of sections, each section being coupled to a different group of said router circuit input terminals, each section comprising connecting means coupled to respective ones of said router circuit input terminals, each of said connecting means in said router circuit comprising a plurality of grant circuits for connecting a data input line, a data input line being coupled to each of said router circuit input terminals, to one of said router circuit output terminals of said router circuit, a group of grant circuits being connected within each output channel, said grant circuits having grant request terminals coupled to grant request signal generation means, said grant request signal generation means generating a request signal for controlling one of said grant circuits to connect a data input line to one of said router circuit output terminals, said grant circuits in said router circuit being arranged in rows and columns, each row being associated with one of said router circuit input terminals, each column being associated with a single router circuit output terminal, each of said sections having at least one end row which is adjacent to an end row in an adjacent section, each of said grant circuits having an enable/disable input terminal and an enable/disable output terminal, a grant circuit being disabled upon application of a first voltage level to its enable/disable input terminal and enabled upon application of a second voltage level to its enable/disable input terminal, a grant circuit outputting said first voltage level at its enable/disable output terminal when disabled or when connecting a data input line to one of said router circuit output terminals and outputting said second voltage level at other times, each of said grant circuits within a same section and in a same column having an enable/disable input terminal coupled to an enable/disable output terminal of a grant circuit in an adjacent row within said same section, except for grant circuits in an end row of a section adjacent to another section; and hyperbar mode/crossbar mode switching means connected between adjacent ones of said sections of said router circuit for coupling enable/disable input terminals of grant circuits in an end row of a section to either enable/disable output terminals of an end row of grant circuits in an adjacent section, for achieving a hyperbar mode, or to a fixed voltage level, for achieving a crossbar mode, said fixed voltage level being either said first voltage level or said second voltage level, wherein in said hyperbar mode a single router circuit input terminal is connectable by said connecting means to any of said router circuit output terminals within an output channel, and wherein in said crossbar mode a single router circuit input terminal is connectable by said connecting means to only a specific one of said router circuit output terminals within said output channel.

12. The router circuit of claim 11 wherein said fixed logic levels are of such levels as to enable only one column of grant circuits per output channel in each of said sections, each of said sections having different columns of grant circuits enabled in said crossbar mode of operation.

13. A router circuit comprising:
a first section and a second section, said first section including a first group of router circuit input terminals, said second section including a second group of router circuit input terminals,
said first section and said second section each including a plurality of controllable switches for connecting, when closed, a single one of said router circuit input terminals to one of a plurality of router circuit output terminals within an output channel,
each of said controllable switches within said first section having an enable/disable input terminal for enabling or disabling a respective controllable switch, a respective controllable switch being disabled upon application of a first voltage level to a respective enable/disable input terminal,
each of said controllable switches within said second section having an enable/disable output terminal for outputting said first voltage level when a respective controllable switch in said second section is closed and outputting a second voltage level when a respective controllable switch in said second section is open; and
a hyperbar mode/crossbar mode switching means, connected between each enable/disable input terminal in said first section and each enable/disable output terminal in said second section, to either connect each enable/disable input terminal to a fixed voltage level to achieve said crossbar mode or connect each enable/disable input terminal to an enable/disable output terminal in said second section to achieve said hyperbar mode, said fixed voltage level being either said first voltage level or said second voltage level, such that at least one enable/disable input terminal in said first section is connected to said first voltage level and at least one enable/disable input terminal is connected to said second voltage level,
wherein in said hyperbar mode said controllable switches can be controlled to connect a router circuit input terminal to one of a plurality of output channels, wherein each output channel includes a group of router circuit output terminals, and wherein in said crossbar mode said controllable switches can be controlled to connect a router circuit input terminal to only a specific one of said plurality of router circuit output terminals due to connecting each enable/disable input terminal to said fixed voltage level, the number of said router circuit output terminals in said hyperbar mode being equal to the number of said router circuit output terminals in said crossbar mode.

14. The router circuit of claim 13 wherein said router circuit is connected within a routing network comprising three interconnected stages, wherein first and second stages of said router network comprise a plurality of first router circuits, each of said first router circuits being identical to said router circuit configured to be in said hyperbar mode, and wherein a third stage of said routing network comprises a plurality of third router circuits, each of said third router circuits being identical to said router circuit configured to be in said crossbar mode, a number of router circuits in said third stage being equal to a number of router circuits in said first stage,
said first router circuits in said first stage having router circuit output terminals being connected to router circuit input terminals of router circuits in said second stage, said third router circuits in said third stage having router circuit input terminals connected to router circuit output terminals of said router circuits in said second stage.

* * * * *